(12) United States Patent
Zolotykh et al.

(10) Patent No.: US 11,106,251 B2
(45) Date of Patent: Aug. 31, 2021

(54) OPERATION OF THE LIGHT MANAGEMENT APPLICATION FOR A MOBILE DEVICE WITH MOTION SENSOR

(71) Applicants: Valeriy Zolotykh, Abington, MA (US); Ravidasa Hegde, Andover, MA (US)

(72) Inventors: Valeriy Zolotykh, Abington, MA (US); Ravidasa Hegde, Andover, MA (US)

(73) Assignee: LEDANCE LLC, Wilmington, MA (US)

( * ) Notice: Subject to any disclaimer, the term of this patent is extended or adjusted under 35 U.S.C. 154(b) by 110 days.

(21) Appl. No.: 15/660,238

(22) Filed: Jul. 26, 2017

(65) Prior Publication Data

US 2019/0034043 A1 Jan. 31, 2019

(51) Int. Cl.
*G06F 3/0482* (2013.01)
*G06F 3/0481* (2013.01)
(Continued)

(52) U.S. Cl.
CPC ............ *G06F 1/1694* (2013.01); *G06F 3/017* (2013.01); *G06F 3/0482* (2013.01); *G06F 3/04812* (2013.01); *G06F 3/04817* (2013.01); *G06F 3/04847* (2013.01); *G06F 3/04883* (2013.01); *H05B 47/105* (2020.01); *H05B 47/125* (2020.01); *H05B 47/19* (2020.01)

(58) Field of Classification Search
CPC .. G06F 3/0482; G06F 3/04842; G06F 3/0488; G06F 3/041; G06F 3/0484; G06F 3/04847; G06F 3/0346; G06F 3/0412; G06F 3/0416; G06F 3/147; G06F 3/03547
See application file for complete search history.

(56) References Cited

U.S. PATENT DOCUMENTS

2009/0303204 A1* 12/2009 Nasiri .................... G06F 3/017
715/810
2011/0112691 A1* 5/2011 Engelen ................ H05B 47/10
700/275
(Continued)

OTHER PUBLICATIONS

Y. Cheng, J. Chen, Y. Liu and S. Wang, "Development of wireless RGB LED dimming control technology using smart phone," 2014 International Conference on Intelligent Green Building and Smart Grid (IGBSG), 2014, pp. 1-4 (Year: 2014).*

*Primary Examiner* — Ariel Mercado
*Assistant Examiner* — Ariel Mercado Vargas
(74) *Attorney, Agent, or Firm* — Tutunjian & Bitetto PC

(57) ABSTRACT

A method and system of controlling lighting that includes displaying on a graphic user interface of a mobile device a grid of light functions. The grid of light functions including a plurality of selectable light function settings. The method may further include selecting a light function setting from the selectable light function settings by traversing a cursor over the light function setting that is selected, wherein motion of the cursor is controlled by motion of the mobile device that includes a motion sensor for correlating said motion of the mobile device to said traversing of the cursor. The method may also include transmitting a control signal for the light function setting that is selected from said mobile device to a luminaire, wherein the luminaire projects light with properties consistent with said light function setting simultaneously with the cursor being present on said light function that is selected.

20 Claims, 8 Drawing Sheets

(51) Int. Cl.
*G06F 3/0484* (2013.01)
*G06F 1/16* (2006.01)
*G06F 3/0488* (2013.01)
*G06F 3/01* (2006.01)
*H05B 47/19* (2020.01)
*H05B 47/105* (2020.01)
*H05B 47/125* (2020.01)

(56) References Cited

U.S. PATENT DOCUMENTS

| | | | |
|---|---|---|---|
| 2013/0201098 A1* | 8/2013 | Schilit | G06F 3/04847 |
| | | | 345/156 |
| 2014/0181704 A1* | 6/2014 | Madonna | G06F 3/0487 |
| | | | 715/762 |
| 2015/0120000 A1* | 4/2015 | Coffey | H04W 4/023 |
| | | | 700/13 |
| 2015/0230320 A1* | 8/2015 | Gritti | H05B 47/175 |
| | | | 340/12.3 |
| 2016/0037611 A1 | 2/2016 | Min et al. | |
| 2016/0085431 A1* | 3/2016 | Kim | G06F 3/0482 |
| | | | 715/735 |
| 2016/0286625 A1 | 9/2016 | Olsen et al. | |
| 2016/0302290 A1* | 10/2016 | Magielse | H05B 47/105 |
| 2016/0374182 A1* | 12/2016 | Newton | G06F 3/04847 |
| 2017/0354019 A1* | 12/2017 | Julian | G06F 3/0482 |

\* cited by examiner

OPERATION OF THE LIGHT MANAGEMENT APPLICATION FOR A MOBILE DEVICE WITH MOTION SENSOR

TECHNICAL FIELD

The present disclosure generally relates to interfaces with lighting, and more particularly to methods of controlling color, color temperature or dimming levels of luminaires through lighting interfaces.

BACKGROUND

Home and professional environments can contain many controllable lighting devices for creation of ambient, atmosphere, accent or task lighting. These controllable lighting devices are often connected and controlled via a network, which can be wired or wireless. These lighting devices can be controlled individually or in groups via a user interface of a lighting control.

SUMMARY

In one aspect, a method for controlling lighting is provided using a mobile computing device having a motion sensor that is present therein as a way to select lighting conditions to be displayed by luminaires that are in communication with the mobile computing device. In one embodiment, the method may include displaying on a graphic user interface of a mobile device a grid of light functions. The grid of light functions may include a plurality of selectable light function settings. A light function setting may be selected from the selectable light function settings on the grid of light functions by traversing a cursor over the light function setting that is selected. Motion of the cursor on the graphic user interface is controlled by motion of the mobile device. The mobile device includes a motion sensor for correlating the motion of the mobile device to traversing of the cursor. A control signal for the light function setting that is selected from said mobile device is transmitted to a luminaire. The luminaire projects light with properties consistent with the selected light function setting simultaneously with the cursor being present on the light function setting that is selected.

In another aspect, a mobile device is provided for controlling luminaires in which the properties for the light being produced by the luminaires are selected by on a graphical user interface having a pointing device, i.e., cursor, that is controlled by motions of the mobile device. The motions of the mobile device that are translated into motions of the cursor on the graphic user interface of the mobile device are measured by a motion sensor that is incorporated into the mobile device. In one embodiment, the mobile device includes a motion sensor for detecting movements of the mobile device, and a graphic user interface having a cursor. The mobile device also including a processor coupled to memory, the processor configured to display using a light function module a plurality of selectable light function settings on the graphic user interface, and correlate using a device motion module the movements of the mobile device measured by the motion sensor to positioning of the cursor on a selected light function setting from the plurality of selectable light function settings. In some embodiments, the mobile device also includes a communications module that is configured to transmit a signal to a luminaire providing instruction that the luminaire display the selected light function setting.

In yet another aspect, a computer program product is provided. In one embodiment, the computer program product includes a non-transitory computer readable storage medium including contents that are configured to cause a computer to perform a method for controlling lighting, the method including displaying on a graphic user interface of a mobile device a grid of light functions. The grid of light functions may include of plurality of selectable light function settings. The method further including selecting a light function setting from the selectable light function settings on the grid of light functions by traversing a cursor over the light function setting that is selected. The motion of the cursor on the graphic user interface is controlled by motion of the mobile device that includes a motion sensor for correlating said motion of the mobile device to said traversing of said cursor, The method may further include transmitting a control signal for the light function setting that is selected from the mobile device to a luminaire. The luminaire projects light with properties that are consistent with the light function setting that is selected simultaneously with the cursor being present on the light function that is selected.

BRIEF DESCRIPTION OF THE DRAWINGS

The following description will provide details of embodiments with reference to the following figures wherein.

DETAILED DESCRIPTION

Figure 1:
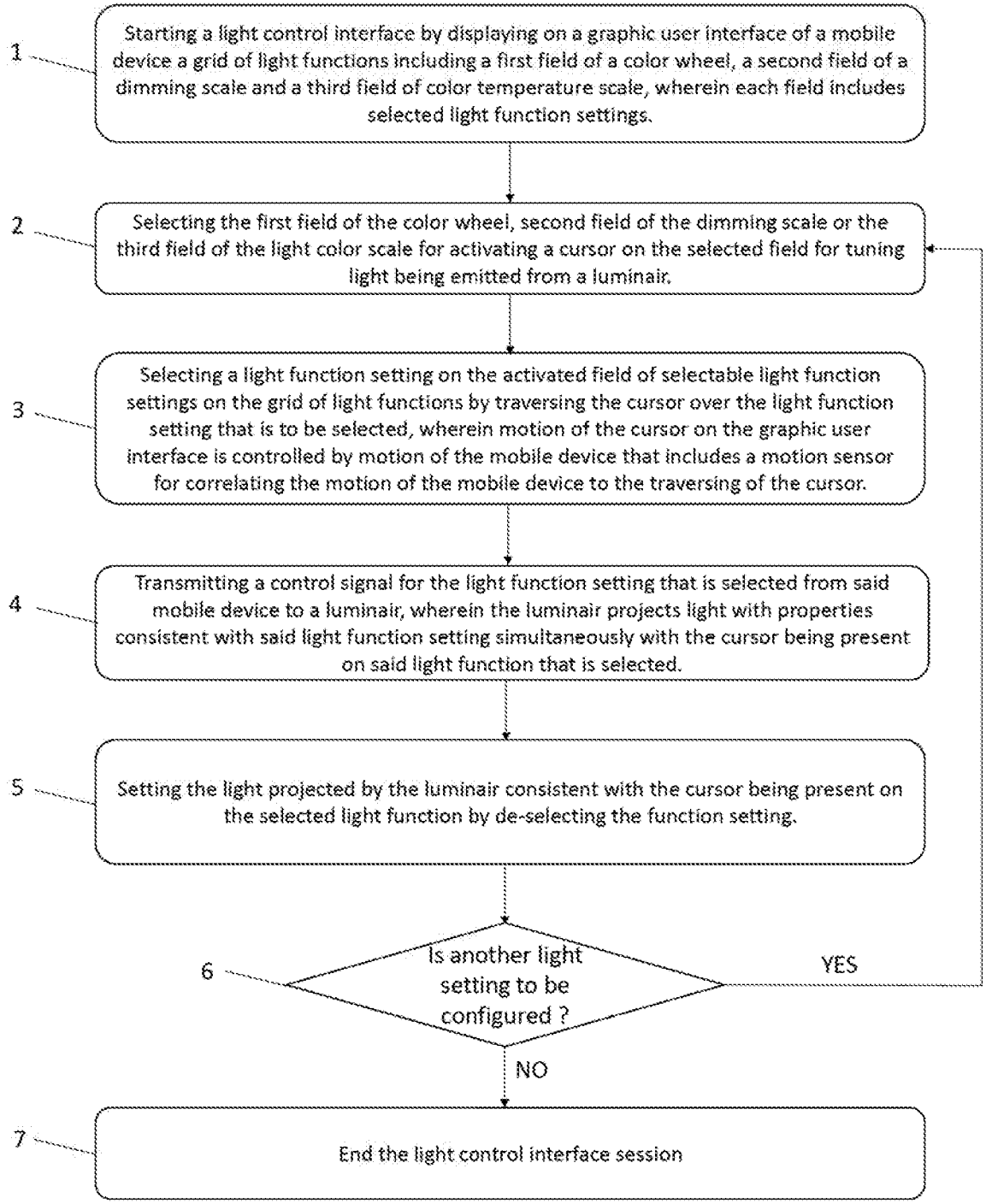
FIG. 1 is a flow diagram showing a method of controlling lighting of luminaires using a graphic user interface having a plurality of selectable light function settings on the display of a mobile device, wherein the light function settings are selected with a cursor controlled through motion of the mobile device, in accordance with one embodiment of the present disclosure.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

In some embodiments, the methods, systems and computer program products that are described herein can control lighting parameters, such as color, color temperature and intensity/dimming, for light being projected by a luminaire, e.g., lamp. The methods, systems and computer program products may be employed using a mobile computing device, such as a cellular phone, e.g., smart phone, or tablet device, having a motion sensor, such as a gyroscope, accelerometer, gravitational sensor and combinations thereof, that is incorporated within the mobile computing device, in which the motions of the mobile computing device are used to select and/or set lighting parameters. Selecting or adjusting the color, color temperature or dimming of light projected by luminaires can be executed using a touch screen type pointing device, but it has been determined that fingertip or stylus tip selections using a touch screen interface are not capable of providing the fine adjustments needed for adjusting and selecting light settings considering the voluminous combinations of settings for color, intensity/dimming and/or color temperature. It has further been determined that this difficulty in precision is amplified when employing the relatively large contact surface of a human fingertip on a relatively small surface of a touch screen of a mobile computing device, such as a smart phone. Fine adjustment is difficult due to the small scale of the image from which the color settings may be selected on the touch screen. The screen resolution and sensitivity of the touch screen are other factors that can further degrade the ability of a user to select lighting settings for fine adjustments.

In some embodiments, the methods, systems and computer program products that are described herein can provide for high precision in fine tuning and/or selection of light settings by controlling light setting selections using the movement of the mobile computing device. For example, by employing a grid of light functions, e.g., color wheel and/or bar shaped gauges, on a graphic user interface of the mobile computing device, and moving a cursor on the selectable light function settings on the grid of light functions for projection by a luminaire, in which the cursors movement corresponds to movement of the mobile computer device, finer precision light setting adjustment and selection is accomplished when compared to touch type pointing devices. For example, the cursor for selecting the light function settings from the grid of light functions may be controlled, i.e., moved, in response to a smart phones angular rotation, and can stop in a location when the motion of the phone stops or returns to a reference position, e.g., reference angle. When the cursor is present overlying, or stop stopped over, a selectable light function setting, the luminaire in communication with the mobile computing device running the lighting application projects light having characteristics consistent with the selected light function setting that is selected by the cursor. The projection of the selected light function setting by the luminaire is simultaneous with the selection of the selected light function setting from the grid of light functions that is selected by the cursor through the mobile computing device movement. This can allow for a user to make a visual review of the light that is being projected by the luminaire in response to the selected light function setting on the graphic user interface of the mobile computing device. Because of the simultaneous projection of light having the selected light function setting occurs while the cursor is present over the selectable light function setting on the graphic user interface, the user can select the light setting based upon its actual projection from the luminaire as opposed to only a theoretical output presented by the graphic user interface. In prior methods, a selection is made from the graphic user interface, and the light is then projected following the selection, at which time it can be reviewed by the user, which is not a simultaneous verification.

As will be described in further details below, the methods, systems and computer program products described herein can in some embodiments provide for finer selection of light settings, and less iteration to select desired settings. Further, the user can visually select actual light output that the user desires, and is not required to make a selection based solely upon a theoretical value. The methods, systems and computer program products that are provided herein are now describe with more detail with reference to FIGS. 1-8.

FIG. 1 is a flow diagram showing a method of controlling lighting of luminaires using a graphic user interface having a plurality of selectable light function settings on the display of a mobile computing device, wherein the light function settings are selected with a cursor controlled through motion of the mobile computing device. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium, which can be non-transitory, that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). A hardware processor may be employed to execute the one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
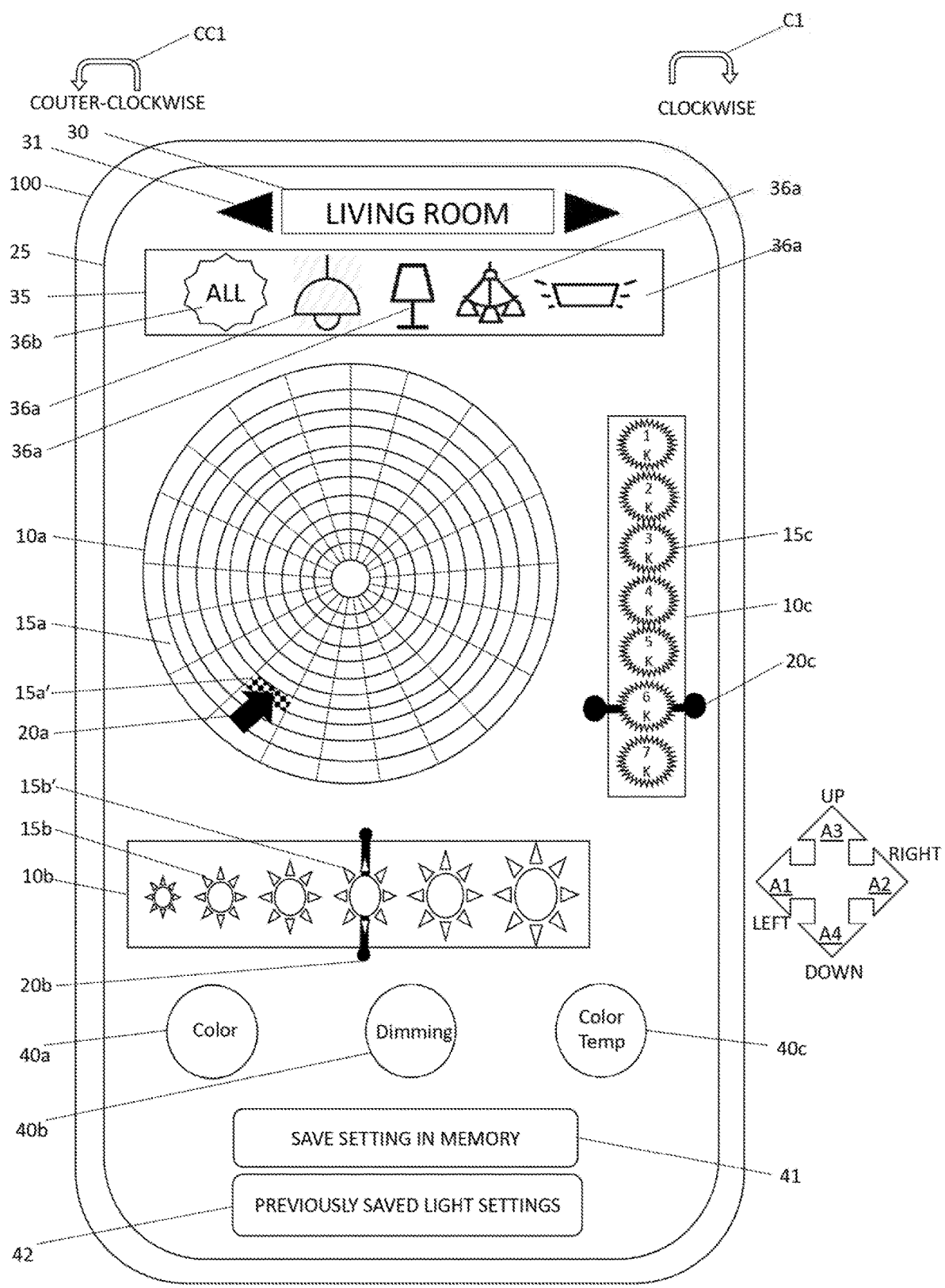
FIG. 2 is an illustration of a screen shot of a graphic user interface on a mobile device that includes a grid of selectable light function settings for a luminaire that can be selected by traversing a cursor over the light function setting to be selected, in which the motion of the cursor on the graphic user interface is controlled by motion of the mobile device, in accordance with one embodiment of the present disclosure.

Referring to step 1 of FIG. 1, the method can begin with starting a light control interface by displaying on the graphic user interface 25 of a mobile computing device 100 a grid of light functions 10a, 10b, 10b, as depicted in FIG. 2, The grid of light functions 10a, 10b, 10c can include a plurality of selectable light functions 15a, 15b, 15c. In the screen shot depicted in FIG. 2, the plurality of the selectable light function settings 15a, 15b, 15c that are included on the grid of selectable light function settings 10a, 10b, 10b for the type of light to be projected by a luminaire can be selected by traversing a cursor 20a, 20b, 20c over the light function setting 15a', 15b', 15c' that the user desires to select. In some embodiments, the motion of the cursor 20a, 20b, 20c on the graphic user interface 25 is controlled by motion of the mobile computing device 100.

The mobile computing device 100 can be a machine for computing calculations including a hardware processor that can be a hand held device. One example of mobile computing device 100 that is suitable for use with the light control methods, systems and computer program products that are described herein includes a phone having a touchscreen interface and an operating system capable of running applications, which can be referred to as a smart phone. In addition to cellular access, the smart phones can also have internet access. Another example of a mobile computing device 100 that is suitable for use with the methods, systems and computer program products described herein can be a tablet computer. In some examples, the tablet computer may be a computer contained in a touchscreen panel housing. The tablet computer may have at least one of internet or cellular access. In some embodiments, the mobile computing device 100 may be a dedicated light controller having a touch screen.

A touch screen is a display screen that is also an input device. The screens are sensitive to pressure. One mechanism by which the user interacts with graphic user interface 25 of the mobile computing device 100 is through the touch screen by touching pictures, icons, words or any selectable image/feature that is displayed on the screen. The touchscreen may be provided by a resistive touchscreen, a surface acoustic wave touchscreen, a capacitive touchscreen or a combination thereof. Any screen that can display the graphic user interface 25 and receiving commands through touch gestures, e.g., finger touch or stylus touch, is suitable for use with the methods, systems and computer program products described herein. As noted above, the touch screen is only one input device used in the mobile computing device for controlling lighting. As will be described in more detail below, a cursor 20a, 20b, 20c can be traversed across the graphic user interface 25 in response to movement of the mobile computing device 100 that is measured by a motion sensor, such as a gyro sensor within the mobile computing device 100, wherein the cursor 20a, 20b, 20c controlled by the movement of the mobile computing device 100 is used to select the selectable light functions 15a, 15b, 15c for characteristics of light to be projected by luminaires.

The graphical user interface (GUI) 25 is a type of user interface that allows users to interact with electronic devices, such as the mobile computing device 100 and luminaires, through graphical icons and visual indicators, such as secondary notation, instead of text-based user interfaces, typed command labels or text navigation. The graphic user interface 25 includes a grid of light functions 10a, 10b, 10c, in which each grid of light functions 10a, 10b, 10c includes selectable light function settings 15a, 15b, 15c, as illustrated in FIG. 2. In one embodiment, the plurality of selectable light function settings 15a includes a plurality of colors. The term "color" denotes a phenomenon of light or visual perception that can enable one to differentiate objects. Color may describe an aspect of the appearance of objects and light sources in terms of hue, brightness, and saturation. Some examples of colors that may be suitable for use with the method of controlling lighting in accordance with the methods, systems and computer program products described herein can include red, orange, yellow, green, blue, indigo, violet and combinations thereof, as well as the numerous shades of the aforementioned families of colors. It is noted that the aforementioned colors are provided for illustrative purposes only and are not intended to limit the present disclosure as any distinguishable color may be suitable for the methods, systems and computer program products described herein.

Figure 3:
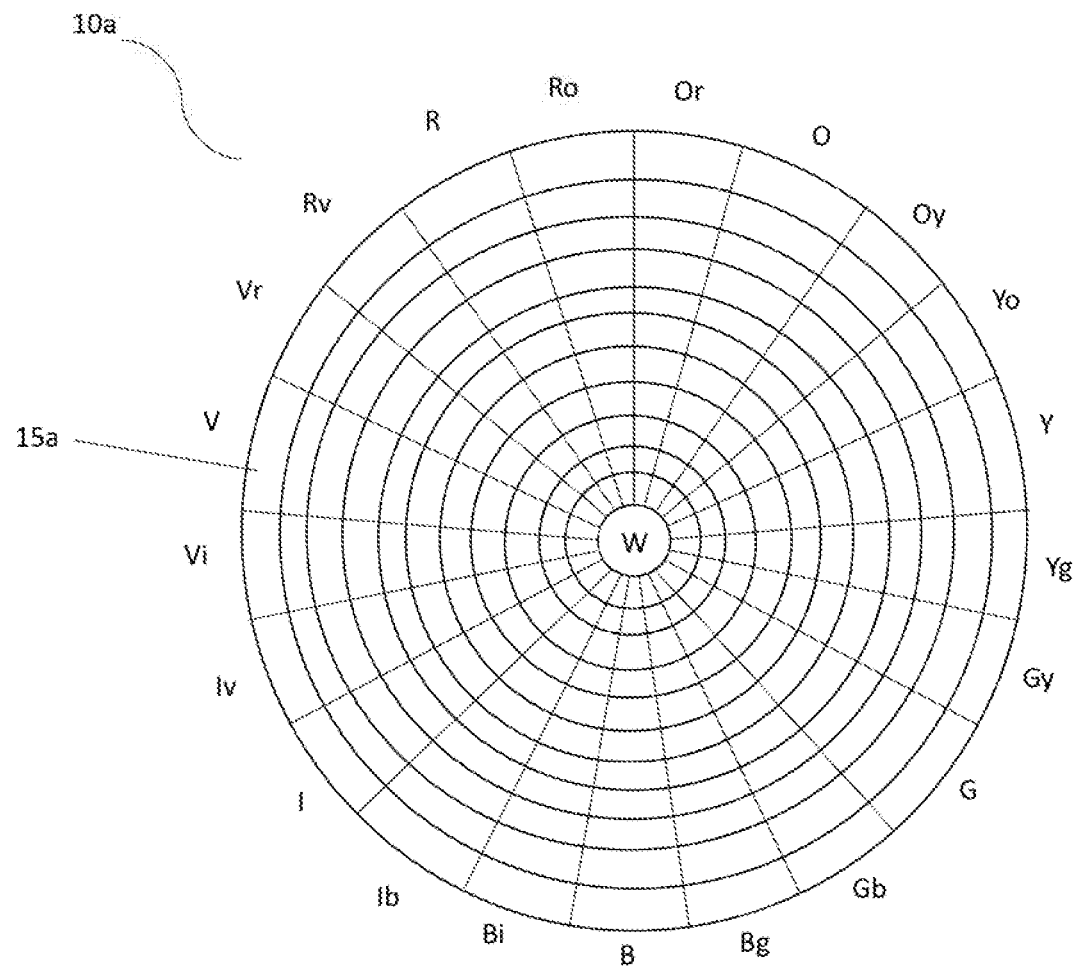
FIG. 3 is an illustration of a color wheel for use as a grid of selectable light function settings on the graphic user interface of the mobile device, in accordance with one embodiment of the present disclosure.

In embodiment, the grid of light functions 10a that provides the selectable light function settings 15a for colors is in the form of a color wheel, as depicted in FIG. 3. In the example of the color wheel may include colors, such as red (R=red), orange (O=orange), green (G=green), blue (B=blue), indigo (I=indigo), and violet (V=violet), in which the color families are arranged following a perimeter in the ROYGBIV sequence. The color wheel includes a plurality of selectable light function settings 15a for each family of the aforementioned colors. In some embodiments, the range of lightness to darkness for each family of colors may range from the lightest colors, i.e., having a greatest degree of white, starting from the center of the color wheel (at which white (W=white) is present), in an increasing degree of darkness, i.e., having a greater degree of black, to a darkest color at the perimeter of the color wheel. In the example that is depicted in FIG. 3, there are 11 selectable light function settings 15a ranging from the lightest variation, i.e., closest to the center of the wheel, to the darkest variation of the color, i.e., present at the outermost perimeter of the wheel. It is noted that this is only one example of the degree of lightness/darkness, e.g., white/dark, present in a color, and is not intended to limit the present disclosure. In other embodiments, the amount of selectable light function settings 15a illustrating the range of lightness to darkness may be equal to 1, 5, 10, 15, 20, 30, 40, 50, 60, 70, 80, 90, 100 and 1000, and any range of light function settings, in which one of the aforementioned examples provides a lower limit to the range and one of the aforementioned examples provides an upper limit to the range, as well as any value within those ranges.

Still referring to FIG. 3, the color wheel may also provide for variations in the color family so that mixtures of colors, e.g., mixtures of red and orange, mixtures of orange and yellow, mixtures of yellow and green etc., are included within the selectable light function settings 15a of the color wheel. In the embodiment depicted in FIG. 3, each family of colors, i.e., red R, orange O, yellow Y, blue B, indigo I and violet V, may include members having a lesser amount of at least a second color that is mixed with the primary color, i.e., red R, orange O, yellow Y, blue B, indigo I and violet V, to provide different shades of the primary color. In the illustration of the color wheel depicted in FIG. 3, for each of the selectable light function settings 15a the primary color is denoted with a capital letter illustrating the majority color, and a lower case letter, i.e., r=red, o=orange, y=yellow, b=blue, i=indigo and v=violet, to illustrate the minority color in the mixture. For example, Ro illustrates a color mixture in which red R is the primary color present in a majority that is mixed with orange o, in which orange o is the secondary color present in a minority amount. In the example depicted in FIG. 3, each color family includes two shades mixed with an adjacent color family on the color wheel. It is noted that this is only one example of the degree of the amount of color mixtures that can be in a family of a primary color, and is not intended to limit the present disclosure. In other embodiments, the amount of selectable light function settings 15a illustrating the range of shades/mixtures within a primary color may be equal to 1, 5, 10, 15, 20, 30, 40, 50 and 100, and any range of light function settings in which one of the aforementioned examples provides a lower limit to the range and one of the aforementioned examples provides an upper limit to the range, as well as any value within those ranges.

It is also noted that the circular geometry of the color wheel that is depicted in FIG. 3 provides only one example of a geometry that is suitable for a grid of light functions 10a including selectable light function settings 15a for color. In other embodiments, a square or other multi-sided geometry may be substituted for the color wheel. Additionally, the selectable light function settings 15a for color may be arranged in a bar scale type geometry. Hereafter, the color wheel may be referred to with reference number 10a. As will be discussed in greater detail below, the colors, i.e., selectable light function settings 15a, may be selected from the color wheel 10a by a cursor 20a that is depicted on the graphic user interface 25 and is controlled through motion of the mobile computing device 100 on which the graphic user interface 25 is displayed. In some embodiments, when the cursor 20a is present over a selectable light function settings 15a. that is selected, the color of light associated with the selected light function setting 15a' is projected by the luminaire.

For example, the cursor 20a may respond to the rotational movement of the mobile computing device 100 to select a selected light function setting 15a' for color that is projected by the luminaire. For example, when the mobile computing device is rotationally tilted about the Y-Y axis depicted in FIG. 4, the cursor may correspondingly move left or right on the color wheel 10a depicted on the graphic user interface 25, and when the mobile computing device is rotationally tilted about the X-X axis depicted in FIG. 4, the cursor 20a may correspondingly move up or down on the color wheel 10a depicted on the graphic user interface 25. Once the cursor is overlying the selected light function setting 15a', as second gesture, such as a movement of the mobile computer device up or down along the direction Z-Z depicted in FIG. 4 may provide a confirmation/selection function.

Referring to FIG. 2, the grid of light functions 10a, 10b, 10c may also include a second field 10b of a dimming scale (dimming scale 10b), and a third field 10c of a color temperature scale (color temperature scale 10c). It is noted that the color temperature scale 10c may be depicted on the graphic user interface 25 simultaneously with the color wheel 10a, as depicted in FIG. 2. It is noted that the dimming scale 10b may be depicted on the graphic user interface 25 simultaneously with the color wheel 10a, as depicted in FIG. 2. In other embodiments, at least one of the color wheel 10a, the dimming scale 10b and the color temperature scale 10c may be omitted.

In one embodiment, the dimming scale 10b includes icons illustrating a degree of dimming, i.e., a degree by which the light being projected by the luminaires. In some examples, dimming or light intensity may be measured using lux. In some embodiments, the dimming or light intensity scale 10b can provide for adjusting lighting between 100 lux to 1000 lux. For example, lighting for office work may be comfortably done at a value between 250 lux to 500 lux. For greater intensity applications, such as work areas that involve drawing or other detail work, the intensity of the lighting may be provided by luminaires that are illuminated to a range within 750 lux to 1,000 lux.

Referring to FIG. 2, in some embodiments the dimming scale 10b (also referred to as second grid of light functions 10b) provides selectable light function settings 15b correlated to dimming/intensity, i.e., a measurement of lux. The dimming scale 10b may have the geometry of a horizontally orientated bar gauge, in which the lowest intensity levels, i.e., highest degree of diming, is present on the left end of the bar gauge, and the highest intensity level is present on the right end of the bar gauge. It is noted that the bar gauge is only one example of the geometry of the grid of light functions 10b that can provide selectable light function settings 15b for dimming/intensity of light being projected by luminaires. Other geometries have also been contemplated, such as circles, may also provide the shape of the dimming scale 10b. Additionally, the dimming scale 10b can be a bar gauge having a different orientation than the lateral orientation depicted in FIG. 2. For example, the dimming scale 10b can be a vertically orientated scale/gauge.

It is not necessary that the selectable light function settings 15b specifically describe numerical lux ranges. In the example depicted in FIG. 2, each selectable light function setting 15b may be depicted by an icon, wherein higher intensity settings are larger in size that lower intensity light settings. In the example depicted in FIG. 2, the icon is sun shaped. In some examples, icons and textual information on light intensity may be simultaneously provided as selectable light function settings 15b on the dimming scale 10b. As will be discussed in greater detail below, the intensity, i.e., selectable light function settings 15b, may be selected from the dimming scale by a cursor 20b that is present on the graphic user interface 25, and is controlled through motion of the mobile computing device 100 on which the graphic user interface 25 is displayed. In some embodiments, when the cursor 20b is present over a selectable light function settings 15b that is selected on the dimming scale 10b, the intensity of light associated with the selected light function setting 15b' of the dimming scale 10b is projected by the luminaire.

Referring to FIG. 2, in some embodiments the color temperature scale 10c provides a grid light functions 10c having selectable light function settings 15c correlated to color temperature, i.e., a measurement having the units degrees Kelvin (° K). The color temperature scale 10c may have the geometry of a vertically orientated bar gauge, in which the lowest color temperature levels, i.e., lowest Kelvin values, are present at the bottom end of the bar gauge, and the highest color temperature levels are present on the top end of the bar gauge. In the embodiment that is depicted in FIG. 2, the icons for the selectable light function settings 15c include a textual description of the value in Kelvin of the light that the icon represents, and the icons increase in size from the smallest size icons representing the lowest Kelvin levels of light to be projected by the luminaires to the greatest size icons representing the highest Kelvin levels of light to be projected by the luminaires. It is not necessary that the selectable light function settings 15c specifically describe numerical Kelvin ranges, or having increasing or decreasing size icons. In some examples, the range of Kelvin selected for the color temperature can range from 1K to 7K.

As will be discussed in greater detail below, the color temperature, i.e., selectable light function settings 15c, may be selected from the color temperature scale 10c by a cursor 20c that is present on the graphic user interface 25 and is controlled through motion of the mobile computing device 100 on which the graphic user interface 25 is displayed. In some embodiments, when the cursor 20c is present over a selectable light function settings 15c that is selected, the color temperature of light associated with the selected light function setting 15c' is projected by the luminaire.

The method may continue with step 2 of the process flow described in FIG. 1. Step 2 may include selecting at least one of the color wheel 10a, the dimming scale 10b and the color temperature scale 10c for activating a cursor 20a, 20b, 20c on the selected field, i.e., color wheel 10a, dimming scale 10b or color temperature scale 10c, for tuning the light being emitted from the luminaire. In some embodiments, before the field, i.e., grid of light functions 10a, 10b, 10c, is selected the user may select the scene, e.g., room, and light function forms, e.g., luminaire type, to which the lighting controls may be applied. The graphic user interface 25 may include a scene icon 30 that indicates the selected scene to which the lighting controls are applied. In the example depicted in FIG. 2, the selected scene is the living room. Other scenes that can be selected may include other room types, such as bedrooms, bathrooms, kitchens, offices, hallways, garages, and other rooms, etc. The scene is not limited to room types. In some instances, the scene can be applied to larger scales, such as a floor or portion of a floor of a building. In other instance, the scene can be an entire building of a group of buildings within an office park.

In one embodiment, the scene may be selected using touch gestures on the graphic user interface 25. For example, the arrow icons 31 on opposing sides to the title "LIVING ROOM" can be employed to cycle through the different scene types that the user may select for the light controls to be applied to. In other embodiments, motions of the mobile computing device 100, which can be measured by a motion sensor within the mobile computing device 100, such as a gyro sensor (gyroscopic sensor), accelerometer, gravity sensor, or combination thereof, may be employed to change a scene. For example, a motion of the mobile computing device 100 laterally, i.e., along the X-X axis depicted in FIG. 4, to the direction of the arrow icon 31 can be used to switch scenes, the scene changes being viewed in text of the scene icon 30 on the graphic user interface 25. It is noted that this is only one example of a means for changing a scene. In other embodiments, voice commands can be employed to change the scene.

Referring to FIG. 2, in some embodiments, in addition to scene selections, the method can allow for light function form selections. A light function form can be a luminaire/lamp type that is within the scene for which the user would like to adjust the lighting. In the example depicted in FIG. 2, the light function form is depicted in a light function form selection list 35 that includes icons 36a for selecting hanging pendant lamps, table lamps, chandeliers and a 2×2 and/or 2×4 tube lighting office type fixture. It is noted that these example light function forms are only some examples of the luminaires that can be controlled by the lighting methods described herein. In other examples, desk lamps, floor standing lamps, recessed can downlights, light sources with heat sinks, as well as any other type of light function form may be employed with the methods, systems and computer program products that are described herein. In some other embodiments, the icons 36a for the light function form may illustrate the type of bulb that is being employed in the luminaire/lamp, such as light emitting diode (LED) type bulbs, incandescent type bulbs, halogen type bulbs, fluorescent, type bulbs, compact fluorescent type bulb and combinations thereof.

In some embodiments, one of the icons is a select all lighting icon 36b. Selection of the select all lighting icon 36b by the user applies all the lighting controls and adjustments for the luminaires being manipulated by the user through the graphic user interface and motion of the mobile computing device 100 to all of the lamps/luminaires that are within a scene.

In one embodiment, the light function form may be selected using touch gestures on the graphic user interface 25. For example, each of the icons 36a, 36b in the light function form selection list 35 may be selected by touch gesture using the touch screen of the mobile computing device 100. In other embodiments, motions of the mobile computing device 100, which can be measured by a motion sensor within the mobile computing device 100, such as a gyro sensor (gyroscopic sensor), accelerometer, gravity sensor, or combination thereof may be employed to select an icon 36a, 36b for a light function form from the light function form selection list 35. For example, a cursor may respond to the rotational movement of the mobile computing device 100 to select each of the icons 36a, 36b. For example, when the mobile computing device 100 is rotationally tilted about the Y-Y axis depicted in FIG. 4, the cursor may correspondingly move left or right on the graphic user interface 25, and when the mobile computing device is rotationally tilted about the X-X axis depicted in FIG. 4, the cursor may correspondingly move up or down on the graphic user interface 25. Once the cursor is overlying the icon to be selected, as second gesture, such as a movement of the mobile computer device up or down along the direction Z-Z depicted in FIG. 4 may provide a confirmation/selection function.

It is noted that the above examples of mechanisms for selecting scenes and light function forms are provided for illustrative purposes only, and are not intended to limit the present disclosure. Other mechanisms for selecting scenes and light function forms may also be employed such as voice commands, as well as selection in response to eye motion sensed by the mobile computing device.

Following the selection of the scene and light function form to which the lighting controls/adjustments are applied, the method may continue with selecting at least one of the color wheel 10a, the dimming scale 10b and the color temperature scale 10c through which lighting adjustments can be made. Referring to FIG. 2, in some embodiments, the graphic user interface 25 includes a color icon 40a, a dimming icon 40b, and a color temperature icon 40c. The color icon 40a activates the color wheel cursor 20a on the color wheel 10a, the dimming icon 40b activates the dimming bar cursor 20b on the dimming scale 10b, and the color temperature icon 40c activates the color temperature cursor 20c on the color temperature scale 10c. It is noted that when one of the color wheel 10a, the dimming scale 10b, and/or the color temperature scale 10c is omitted from the graphic user interface 25, the corresponding color icon 40a, dimming icon 40b and color temperature icon 40c is omitted.

Selection of the color icon 40a, dimming icon 40b and/or the color temperature icon 40c can be provided by touch gesture. For example, in some embodiments, when a user fingertip is present on the color icon 40a to provide a touch gesture for selecting the color icon 40a, as long as the user maintains the fingertip contact to the color icon 40a, the color wheel cursor 20a is active on the color wheel 10a, and moves on the color wheel 10a in response to the motion of the mobile computing device 100. In some embodiments, after the user removes their finger tip from contacting the color icon 40a, e.g., ends the fingertip contact to the color icon 40a, the color wheel cursor 20a is no longer active on the color wheel 10a. Similarly, when a user selects the dimming icon 40b by contacting the dimming icon 40b on the graphic user interface 25 by touch gesture, e.g., fingertip contact, the dimming cursor 40b is activated on the dimming scale 10b, and moves on the dimming scale 10b in response to the motion of the mobile computing device 100. Further, when a user removes the fingertip contact from the dimming icon 40b, the dimming cursor 40b is no longer active. Additionally, when a user selects the color temperature icon 40c by contacting the color temperature icon 40c on the graphic user interface 25 by touch gesture, e.g., fingertip contact, the color temperature cursor 40c is activated on the color temperature scale 10c, and moves on the color temperature scale 10c in response to the motion of the mobile computing device 100. Further, when a user removes the fingertip contact from the color temperature icon 40c, the color temperature cursor 40c is no longer active.

Referring to FIG. 1, in some embodiments, the method may continue with selecting a light function setting 15a', 15b', 15c' on the activated field of selectable light function settings 15a, 15b, 15c on the grid of light functions 10a, 10b, 10c (e.g., color wheel 10a, dimming scale 10b, and color temperature scale 10c) by traversing a cursor 20a, 20b, 20c over the light function setting 15a', 15b', 15c' being selected, wherein motion of the cursor 20a, 20b, 20c on the graphic user interface 25 is controlled by motion of the mobile computing device 100. The mobile computing device 100 includes a motion sensor for correlating the motion of the mobile computing device 100 to the cursor 20a, 20b, 20c.

As noted above, activation of a field of selectable light function settings 15a, 15b, 15c can include selecting one of the color icon 40a, the dimming icon 40b and the color temperature icon 40c as described in step 2 of the method illustrate in FIG. 1. Activation of the field can mean that the cursor 20a, 20b, 20c is free to move and select one of the selectable light function settings 15a, 15b, 15c from the selected color wheel 10a, dimming scale 10b and/or color temperature scale 10c.

Movement of the cursor 20a, 20b, 20c is responsive to movement of the mobile computing device 100. The movement of the mobile computing device 100 is sensed by a motion sensor that is present within the mobile computing device 100, in which the movement sensed by the motion sensor is translated into motion of the cursor 20a, 20b, 20c on the graphic under interface 25, i.e., motion of the cursor 20a, 20b, 20c over the plurality of selectable light function settings 15a, 15b, 15c of the color wheel 10a, the dimming scale 10b or the color temperature scale 10c.

The motion sensor that senses the motion of the mobile computing device 100 may be at least one of a gyroscopic sensor (also referred to as gyro sensor), accelerometer, gravitational sensors and combinations thereof. In some embodiments, the motion sensors may be formed using Microelectromechanical Systems (MEMS), bonded gage and/or piezoelectric ceramic/film technologies. Gyroscopic sensors are sensors that are configured to measure the rotation of a mobile computing device 100. An accelerometer is a sensor that is configured to acceleration applied to the mobile computing device 100. Gravitational sensors are sensors configured to measure gravitational forces acting upon the mobile computing device 100.

Figure 4:
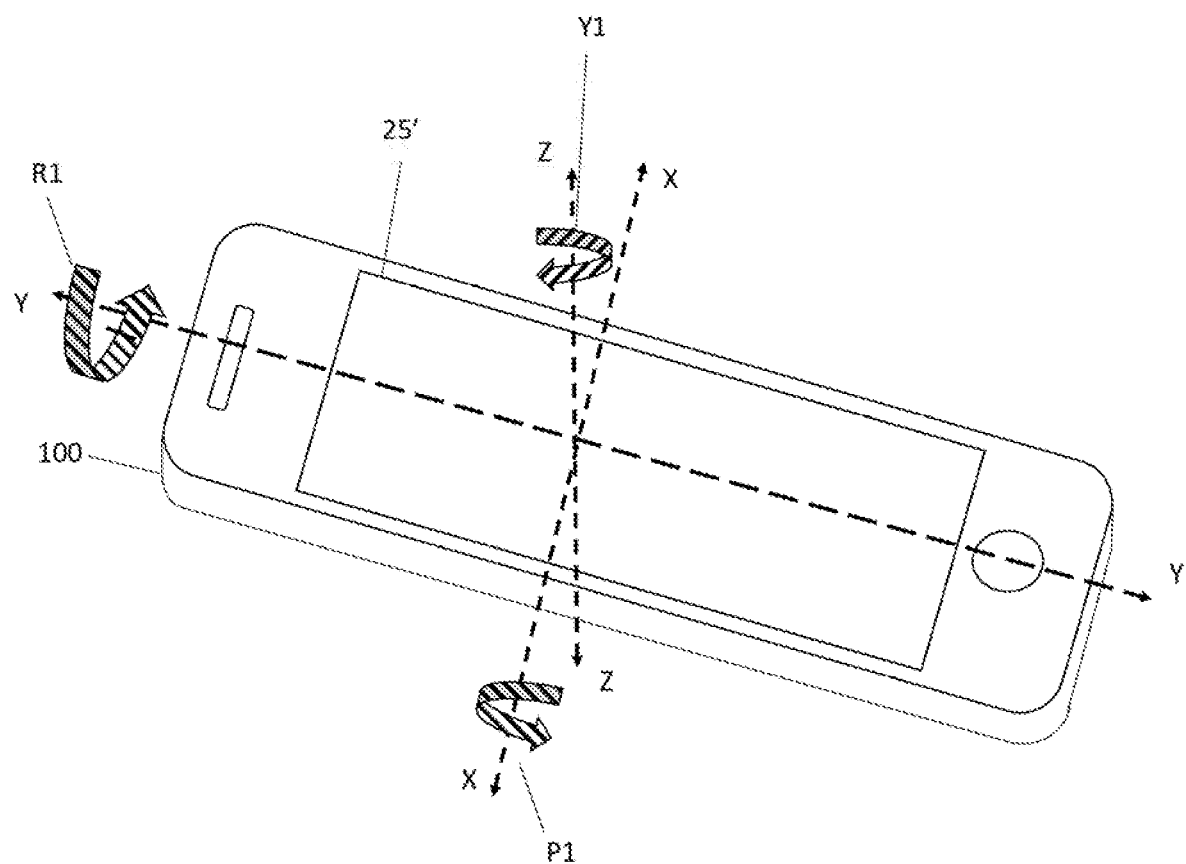
FIG. 4 is an illustration depicting a mobile computing device having referential axis in which movement of the mobile computing device about the referential axis can be measured by a motion sensor within the mobile computing device, wherein the motion of the mobile computing device measured by the motion sensor can be employed as a mechanism for controlling the motion of the cursor on the graphic user interface including the plurality of selectable light function settings, in accordance with one embodiment of the present disclosure.

FIG. 4 depicts a mobile computing device 100 having referential axis in which movement of the mobile computing device 100 about the referential axis can be measured by a motion sensor within the mobile computing device 100, and employed as the motion mechanism for controlling the motion of the cursor 20a, 20b, 20c on the graphic user interface 25 including the plurality of selectable light function settings 15a, 15b, 15c for the selected color wheel 10a, dimming scale 10b and/or the color temperature scale 10c.

When describing motion sensors and the values produced therefrom by the motion of the mobile computing device 100, establishment of an inertial frame of reference can be helpful. In this example embodiment, the X-X, Y-Y, and Z-Z axes shown in FIG. 4, which define a three-dimensional Cartesian coordinate system, may be used to provide such an inertial frame of reference. As can be seen in this example case, the origin of the coordinate system is the center of mobile computing device 100. Further, the X-X axis follows the horizontal shape of mobile computing device 100, with the positive X-axis extending through (or pointing toward) the right side of the device and the negative X-axis extending through the left of the device. In addition, the Y-Y axis follows the vertical shape of mobile computing device 100 with the positive Y-axis extending through the top side of the device and the negative Y-axis extending through the bottom side of the device. Moreover, the Z-Z axis is normal to the display of mobile computing device 100 (also normal to the X-Y plane) on which the graphic user interface 25 is displayed with the positive Z-axis extending through the front of the device and the negative Z-axis extending through the back of the device.

In one embodiment, the accelerometer that is employed as a motion sensor in the mobile computing device 100 is a multi-axis accelerometer that can measure acceleration in each axis. For example, a three-axis accelerometer can detect motion in three different directions. For instance, a linear accelerometer may be included for measuring moving forces applied to the mobile computing device 100. In some embodiments, an accelerometer can be a motion sensor that can detect motion of the mobile computing device 100 along the three axis depicted in FIG. 4 having reference identifiers X-X, Y-Y, and Z-Z. Such measurements may be denoted as a vector $\vec{L}$ along each of the axes (X-X, Y-Y, Z-Z) of device 100, such that $\vec{L}=\langle L_x, L_y, L_z \rangle$. For example, each vector may be unconstrained and measured in m/s², and the linear accelerometer may be useful for tracking motion with respect to the device. In some embodiments, in addition to linear motion and orientation detection, accelerometers can measure tap and shake motions applied to the mobile computing device 100.

Gyroscopes on the other hand respond to rotation, which is a measure of angular motion. In some embodiments, gyroscopes function as three-axis inertial sensors. Gyroscopes can measure movement around three axes with three sensors one each for pitch, yaw, and roll. The rotation around the pitch axis for which a gyroscope can measure movement is identified in FIG. 4 by reference identifier. The rotation P1 for pitch is around the X-X axis. The rotation around the roll axis for which a gyroscope can measure movement is identified in FIG. 4 by reference identifier R1. The rotation R1 for roll is around the Y-Y axis. The rotation around the yaw axis for which a gyroscope can measure movement is identified in FIG. 4 by reference identifier Y1. The rotation Y1 for yaw is around the Z-Z axis.

In some example embodiments, gyroscopic sensor(s) may be configured to determine the orientation and/or rate of rotation of the mobile computing device 100. In some embodiments, the gyroscopic sensor may measure the rate of rotation of the device 200 as a vector, such as a vector $\vec{R}$, such that $\vec{R} = \langle R_{R1}, R_{P1}, R_{Y1} \rangle$, where each component is the rate of rotation around an inertial axis of the device, in terms of radians per second (rad/s). In such an example case, each component of {right arrow over (R)} may be unconstrained, and if the device is at ideal rest, $\vec{R}$, would be equal to $\langle 0, 0, 0 \rangle$.

It is noted that the motion sensors of the mobile computing device 100 are not limited to only accelerometers and gyroscopic sensors as discussed above. For example, the motion sensors used to measure movements of the mobile computing device 100, in which those measured movements are used to control the movement of a cursor 20a, 20b, 20c, can also include gravitational sensor(s), magnetometer(s) and/or geomagnetic sensor(s).

In some embodiments, a reference position for the mobile computing device 100 is set at the time a user selects at least one of the color wheel 10a, the dimming scale 10b and the color intensity scale 10c for activating the cursor 20a, 20b, 20c on the selected field, i.e., color wheel 10a, dimming scale 10b or color intensity scale 10c, for tuning the light being emitted from the luminaire. This can begin at step 2 with the selection of the color icon 40a, the dimming icon 40b, or the color temperature icon 40c by touch gesture of the user with the graphic user interface 25 of the mobile computing device 100. For example, at the time the user selects one of the color icon 40a, the dimming icon 40b, or the color temperature icon 40c by touch gesture, the orientation of the mobile computing device 100 at that instant is measured and recorded, which becomes the initial orientation of the mobile computing device 100 from which rotation motion and/or liner motion can be measured for controlling the cursor 20a, 20b, 20c on at least one of the color wheel 10a, dimming scale 10b, and/or color temperature scale 10c.

For example, referring to FIGS. 2 and 4, when the user has activated the cursor 20a on the color wheel 10a by touch gesture contact to the color icon 40a, rotational movement of the mobile computing device 100 that can include pitch rotation P1, roll rotation R1 and yaw rotation Y1 is measured by a motion sensor, such as a gyroscopic sensor, and is translated to motion of the cursor 20a on the graphic user interface 25 overlying the color wheel 10a. For example, rolling the mobile computing device 100 by rotating the mobile computing device 100 about the Y-Y axis, i.e., rotation R1 depicted in FIG. 4, traverses the cursor 20a on the graphic user interface 25 in the direction A1 (LEFT) or A2 (RIGHT) depending upon whether the mobile computer device 100 is being rotated towards the left side of the device (negative X) or whether the mobile computing device 100 is being rotated towards the right side of the device (positive X). More specifically, rotating the mobile computing device 100 by roll rotation R1 towards the left side of the device (negative X) moves the cursor 20a on the graphic user interface 25 in a left direction A1; and rotating the mobile computing device 100 by roll rotation R1 towards the right side of the device (positive X) moves the cursor 20a on the graphic user interface 25 in a right direction A2.

In another example, pitching the mobile computing device 100 by rotating the mobile computing device 100 about the X-X axis, i.e., rotation P1 depicted in FIG. 4, traverses the cursor 20a on the graphic user interface 25 in the direction A3 (UP) or A4 (DOWN) depending upon whether the mobile computer device 100 is being pitched towards the uppermost end of the device (positive Y) or whether the mobile computing device 100 is being pitched towards the lowermost end the device (negative Y). More specifically, rotating the mobile computing device 100 by pitch rotation P1 towards the uppermost side of the device (positive Y) moves the cursor 20a on the graphic user interface 25 in an up direction A3; and rotating the mobile computing device 100 by pitch rotation p1 towards the lowermost end of the device (negative Y) moves the cursor 20a on the graphic user interface 25 in a down direction A4.

In yet another example, yaw motion applied to the mobile computing device 100 by rotating the mobile computing device 100 about the Z-Z axis, i.e., rotation Y1 depicted in FIG. 4, traverses the cursor 20a on the graphic user interface 25 in a clockwise direction C1 or counterclockwise CC1 direction depending upon whether the mobile computer device 100 is being moved in a yaw direction is being rotated towards the left side of the device (negative X) or whether the mobile computing device 100 is being rotated towards the right side of the device (positive X). More specifically, rotating the mobile computing device 100 by yawn rotation Y1 towards the left side of the device (negative X) moves the cursor 20a on the graphic user interface 25 along a counterclockwise CC1 arcular direction; and rotating the mobile computing device 100 by yawn rotation Y1 towards the right side of the device (positive X) moves the cursor 20a on the graphic user interface 25 in a clockwise C1 arcular direction. The term "arcular" means along a line having a curve.

It is noted that the aforementioned rotational directions may be used in combination to move the cursor 20a in a plurality of diagonal directions between each of the right direction A2 and the upward direction A3, the left direction A1 and the upward direction A3, the right direction A2 and the downward direction A4, and the left direction A1 and the downward direction A4, as wells as the aforementioned diagonal directions being used in combination with counterclockwise CC1 and clockwise C1 motion of mobile computing device 100 to control the cursor 20a.

The plurality of directions, diagonals, counterclockwise and clockwise motion that can be applied to the motion of the cursor 20a, and controlled through motion of the mobile computing device 100, to traverse the cursor 20a on the plurality of selectable light functions 15a on the color wheel 10a, which can each apply to a different shade of color with different degree of darkness/lightness, provides for a higher degree of adjustments and finer adjustments for projected light color from a luminaire than what can be provided by previously available lighting control interfaces relying solely on a touch screen or solely on gestures applied to a mobile device.

It is noted that selecting a light function setting 15a is not limited to controlling the cursor 20a on the color wheel 10a using rotational motion of the mobile computing device 100 measured by a gyroscopic sensor. In other embodiments, linear motions applied to the mobile computing device 100, which can be measured using an accelerometer, can be used to move the cursor 20a. For example, moving the mobile computing device 100 linearly along the Y-Y axis depicted in FIG. 4 can be correlated to movements of the cursor 20a on the color wheel 10a in the up direction A3 and the down direction A4; and movements of the mobile computing device 100 linearly along the X-X direction can be correlated to movements on the color wheel 10a in the left direction A1 and the right direction A2. More specifically, linear motion of the mobile computing device 100 along the X-X axis towards the left side of the device (negative X) moves the cursor 20a on the graphic user interface 25 in a left direction A1; linear motion of the mobile computing device 100 along the X-X axis towards the right side of the device (positive X) moves the cursor 20a on the graphic user interface 25 in a right direction A2; linear motion of the mobile computing device 100 about the Y-Y axis towards the uppermost side of the device (positive Y) moves the cursor 20a on the graphic user interface 25 in an up direction A3; and linear motion of the mobile computing device 100 in the direction of the lowermost end of the device (negative Y) moves the cursor 20a on the graphic user interface 25 in a down direction A4.

Controlling the motion of the cursor 20b for the dimming scale 10b is similar to controlling the motion of the cursor 20a for the color wheel 10a. For example, following selection of the dimming scale icon 40b, the cursor 20b on the dimming scale 10b is activated, wherein motion of the cursor 20b, i.e., left to right motion, may be controlled through rotational motion of the mobile computing device 100. Similar to selecting the color wheel 10a, following selection of the dimming scale icon 40b, the orientation of the mobile computing device 100 at that instant is measured and recorded, which becomes the initial orientation of the mobile computing device 100 from which rotation motion and/or liner motion can be measured for controlling the cursor 20b on the dimming scale 10b. In one example, following activation of the cursor 20b on the dimming scale 10b, rolling the mobile computing device 100 by rotating the mobile computing device 100 about the Y-Y axis, i.e., rotation R1 depicted in FIG. 4, traverses the cursor 20b on the dimming scale 10b in the direction A1 (LEFT) or A2 (RIGHT) depending upon whether the mobile computer device 100 is being rotated towards the left side of the device (negative X) or whether the mobile computing device 100 is being rotated towards the right side of the device (positive X). More specifically, rotating the mobile computing device 100 by roll rotation R1 towards the left side of the device (negative X) moves the cursor 20b on the graphic user interface 25 in a left direction A1; and rotating the mobile computing device 100 by roll rotation R1 towards the right side of the device (positive X) moves the cursor 20b on the graphic user interface 25 in a tight direction A2.

It is noted that selecting a light function setting 15b on the dimming scale 10b is not limited to controlling the cursor 20a using rotational motion of the mobile computing device 100 measured by a gyroscopic sensor. In other embodiments, linear motions applied to the mobile computing device 100, which can be measured using an accelerometer, can be used to move the cursor 20b on the dimming scale 10b. For example, movements of the mobile computing device 100 linearly along the X-X direction can be correlated to movements on the dimming scale 10b in the left direction A1 and the right direction A2. More specifically, linear motion of the mobile computing device 100 along the X-X axis towards the left side of the device (negative X) moves the cursor 20b on the graphic user interface 25 in a left direction A1 and linear motion of the mobile computing device 100 along the X-X axis towards the right side of the device (positive X) moves the cursor 20b on the graphic user interface 25 in a right direction A2.

Controlling the motion of the cursor 20c for the color temperature scale 10c is also similar to controlling the motion of the cursor 20a for the color wheel 10a. For example, following selection of the color temperature icon 40c, the cursor 20c on the color temperature scale 10c is activated, wherein motion of the cursor 20c, i.e., up to down motion, may be controlled through rotational motion of the mobile computing device 100. Following selection of the temperature scale icon 40c, the orientation of the mobile computing device 100 at that instant is measured and recorded, which becomes the initial orientation of the mobile computing device 100 from which rotation motion and/or liner motion can be measured for controlling the cursor 20c on the color temperature scale 10c.

In one example, following activation of the cursor 20c on the color temperature scale 10c, adjusting the pitch of the mobile computing device 100 by rotating the mobile computing device 100 about the X-X axis, i.e., rotation P1 depicted in FIG. 4, traverses the cursor 20c on the color temperature scale 10c in the direction A3 (UP) or A4 (DOWN) depending upon whether the mobile computer device 100 is being rotated in a pitch direction towards the uppermost end of the device (positive Y) or whether the mobile computing device 100 is being rotated in a pitch direction towards the lowermost end the device (negative Y). More specifically, rotating the mobile computing device 100 by pitch rotation P1 towards the uppermost side of the device (positive Y) moves the cursor 20c on the graphic user interface 25 in an up direction A3; and rotating the mobile computing device 100 by pitch rotation P1 towards the lowermost end of the device (negative Y) moves the cursor 20c on the graphic user interface 25 in a down direction A4.

It is noted that selecting a light function setting 15c on the color temperature scale 10c is not limited to controlling the cursor 20c using rotational motion of the mobile computing device 100 measured by a gyroscopic sensor. In other embodiments, linear motions applied to the mobile computing device 100, which can be measured using an accelerometer, can be used to move the cursor 20c on the color temperature scale 10c. For example, movements of the mobile computing device 100 linearly along the Y-Y direction can be correlated to movements of the cursor 20c on the color temperature scale 10c in the up direction A3 and the down direction A4. More specifically, linear motion of the mobile computing device 100 along the Y-Y axis towards the uppermost side of the device (positive Y) moves the cursor 20c on the graphic user interface 25 in an up direction A3; and linear motion of the mobile computing device 100 in the direction of the lowermost end of the device (negative Y) moves the cursor 20c on the graphic user interface 25 in a down direction A4.

It is noted that the above described motions of the mobile computing device 100 and the movement of the cursor 20a, 20*b*, 20*c* in response to the mobile computing device 100 have been provided for illustrative purposes only, and are not intended to limit the present disclosure, as other types of motions that can be applied to the mobile computing device 100 have been contemplated for controlling the lighting functions described above.

In each of the above examples, a cursor 20*a*, 20*b*, 20*c* is traversed along a graphic user interface 25 in response to motion applied to the mobile computing device 25 having a display, e.g., touch screen, on which the graphic user interface is being displayed. The cursor 20*a*, 20*b*, 20*c* is traversed over selectable light functions 15*a*, 15*b*, 15*c* on a grid of light functions, i.e., a grid of light functions including regions for the color wheel 10*a*, dimming scale 10*b*, and the color temperature scale 10*c*. As noted above, each of the selectable light functions 15*a*, 15*b*, 15*c* have a light property assigned thereto, and when the cursor is present over a selectable light function 15*a'*, 15*b'*, 15*c'*, that light property is projected by the luminaire, as described in step 4 of the method illustrated in the flow chart depicted in FIG. 1.

Step 4 of the method depicted in FIG. 1, includes transmitting a control signal for the light function setting 15*a'*, 15*b'*, 15*c'* that is selected from said mobile computing device 100 to a luminaire, wherein the luminaire projects light with properties consistent with the light function setting 15*a'*, 15*b'*, 15*c'* simultaneously with the cursor being present on the light function that is selected. For example, when the cursor is present overlying, or stop stopped over, a selectable light function setting 15*a'*, 15*b'*, 15*c'*, the luminaire in communication with the mobile computing device 100 running the lighting application projects light having characteristics consistent with the selected light function setting 15*a'*, 15*b'*, 15*c'* that is selected by the cursor 20*a*, 20*b*, 20*c*. The projection of light by the luminaire having the characteristics of the selected light function setting is simultaneous with the selection of the selected light function setting 15*a'*, 15*b'*, 15*c'* from the grid of light functions, e.g., the color wheel 10*a*, the dimming scale 10*b* or the color temperature scale 10*c*, that is selected by the cursor 20*a*, 20*b*, 20*c* through the mobile device movement 100. The user can make a visual review of the light that is being projected by the luminaire in response to the selected light function setting 15*a'*, 15*b'*, 15*c'* on the graphic user interface of the mobile device 100. Because the simultaneous projection of light having the selected light function setting 15*a'*, 15*b'*, 15*c'* occurs while the cursor 20*a*, 20*b*, 20*c* is present over the selectable light function setting 15*a'*, 15*b'*, 15*c'* on the graphic user interface 25, the user can select the light setting based upon its actual projection from the luminaire as opposed to only a theoretical output presented by the graphic user interface 25.

Communication between the mobile computing device 100 and the luminaires projecting the light is typically through a wireless connection, such as WiFi, Bluetooth, interact based connections, cellular connections and combinations thereof. In other embodiments, the communication between the mobile computing device 100 and the luminaires projecting the light may be through a wired connection, such as a local network connection, e.g., ethernet type connection. As described in further details below, both the mobile computing device 100 and the luminaires may include communications modules providing for intercommunication between the devices.

Referring to FIG. 1, in some embodiments, the method can include setting the light projected by the luminaire consistent with the cursor 20*a*, 20*b*, 20*c* being present on the light function that is selected 15*a'*, 15*b'*, 15*c'*. In some embodiments, setting the light projected by the luminaire may include deselecting the previously selected first field of the color wheel 10*a*, second field of the dimming scale 10*b* or third field of the color temperature scale 10*c*. This can include the user removing the finger touch gesture that originally selected the field, which activated the cursor 20*a*, 20*b*, 20*c* on the selected field for movement in selecting a selectable light functions 15*a*, 15*b*, 15*c* on the grid of light functions.

In other embodiments, setting the light projected by the luminaire consistent with the cursor 20*a*, 20*b*, 20*c* being present on the light function that is selected 15*a'*, 15*b'*, 15*c'* may include a confirmation gesture that is provided by a movement applied to the mobile computing device 100. The confirmation gesture may be any movement applied to the mobile computing device 100 that can be measured with a motion sensor that is present within the mobile computing device 100, such as the same motion sensor used to move the cursor 20*a*, 20*b*, 20*c* on the graphic user interface 25. In some embodiments, the confirmation gesture may be a linear movement of the mobile computing device 100 that can be measured with an accelerometer. One example, of a confirmation gesture for setting the light projected by the luminaire consistent with the cursor 20*a*, 20*b*, 20*c* being present on the light function that is selected 15*a'*, 15*b'*, 15*c'* may be an upward motion or downward motion of the mobile computing device 100 along the direction of the Z-Z axis depicted in FIG. 4. In this example, the user visually viewing the projected light from the luminaire that is projecting light according to the light function selected 15*a'*, 15*b'*, 15*c'* according to the cursor 20*a*, 20*b*, 20*c* on the graphic user interface 25 can confirm the setting by the confirmation gesture of moving the mobile computing device 100 in an upward or downward motion along the Z-Z axis. It is noted that this example only illustrates one type of motion applied to the mobile computing device 100 that can provide a confirmation gesture. Other linear motions, such as those along the X-X axis and the Y-Y axis of the mobile computing device, as well as rotational movements R1, P1, Y1, as depicted in FIG. 4, may also provide confirmation gestures for setting a lighting to be projected at the luminaire.

In yet other examples, setting the light projected by the luminaire consistent with the cursor 20*a*, 20*b*, 20*c* being present on the light function that is selected 15*a'*, 15*b'*, 15*c'* may include a voice command, such as "SET". In yet further examples, setting the light projected by the luminaire consistent with the cursor 20*a*, 20*b*, 20*c* being present on the light function that is selected 15*a'*, 15*b'*, 15*c'* can include establishing eye contact with the mobile computing device 100, in the instances in which the mobile computing device 100 includes a sensor for reading eye communications, such as an iris scanner.

In some embodiments, when the light projected by the luminaire is set, either by confirmation gesture, voice command and/or by reading eye communication, the luminaire and/or mobile computing device may emit an affirmation signal. Examples of an affirmation signal emitted by the mobile computing device may be an audible tone or ring, a light flash or a vibration of the mobile computing device 100.

In some embodiments, setting the light projected by the luminaire consistent with the cursor 20*a*, 20*b*, 20*c* being present on the light function that is selected 15*a'*, 15*b'*, 15*c'* may include a confirmation time period during which the confirmation gesture is to be received. In event that a confirmation gesture is not received during the confirmation time period, the luminaires may reset to project light having a default setting or the luminaires may rest to project light from a previously set light setting.

In some embodiments, following setting of the light projected by the luminaire consistent with the cursor being preset on the light function that is selected, the user has the option to save the selected light function so that the user can select the selected light characteristics at a later time. This can begin with the user selecting the save setting in memory icon 41 that is present on the graphic user interface 25. The user can select the save setting in memory icon 41 through touch gesture pointing selection via the touch screen of the mobile computing device 100 on which the graphic user interface 35 is being displayed. The light setting may be saved in a form of memory, e.g., non-transitory memory, that can be present in the mobile computing device 100, or in a form of memory, e.g., non-transitory memory, that is housed in at least one of the luminaires to which the lighting controls are being applied. In yet other examples, the light settings can be saved in a cloud based memory or in memory accessible through a local network that is in communication with at least one of the mobile computing device 100.

Figure 5:
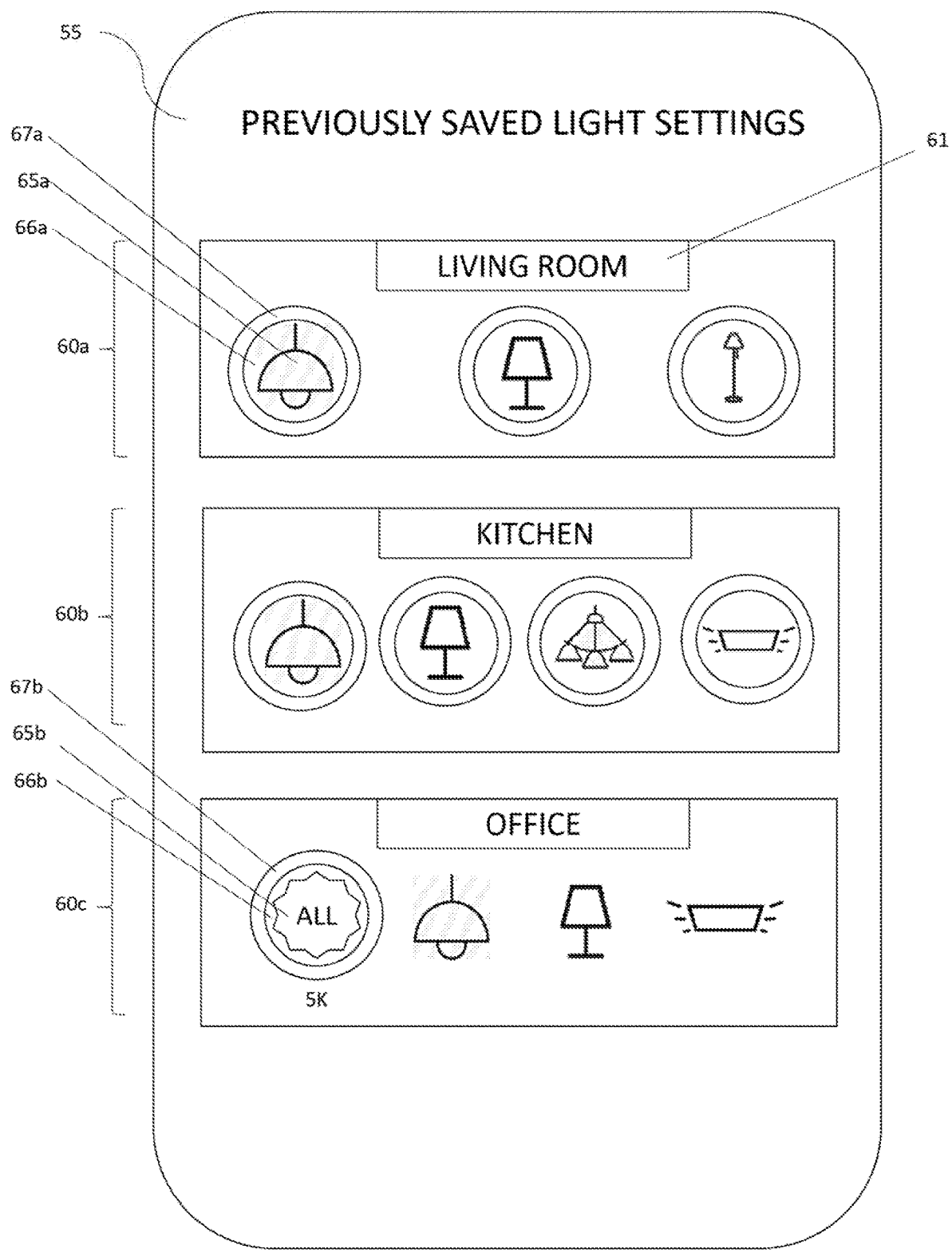
FIG. 5 is an illustration depicting a screen shot of a graphic user interface on a mobile device depicting icons for activating luminaires having saved light settings for the light that they project, in accordance with one embodiment of the present disclosure.

FIG. 5 depicts one embodiment of a screen shot 55 of a graphic user interface on a mobile computing device 100 depicting icons 65*a*, 65*b* for activating luminaires having saved light settings for the light that they project. The icons 65*a*, 65*b* can be selected by touch gesture using the touch screen of the mobile computing device 100 displaying the graphic user interface on which the icons 65*a*, 65*b* are displayed. The icons 65*a*, 65*b* include information for the light form function of the luminaire, as well as information about the type of light setting that was saved for the luminaire to project when selected. For example, each icon 65*a* may have a symbol illustrating the light function form of the luminaire, which could be in the form of hanging pendant lamps, table lamps, chandeliers, 2×2 and/or 2×4 tube lighting office type fixtures, desk lamps, floor standing lamps, recessed can downlights, light sources with heat sinks, as well as any other type of light function form may be employed with the methods, systems and computer program products that are described herein.

In some embodiments, each icon 65*a*, 65*b* can have a perimeter identifier 67*a*, 67*b* for illustrating some characteristic of the light setting that is saved for the corresponding light function form. For example, the perimeter identifier 67*a*, 67*b* may be color coded consistent with the color selected for the light to be projected by the luminaire corresponding to the icon 65*a*, 65*b*. In some embodiments, the icons 65*a*, 65*b* can have an icon background 66*a*, 66*b* for illustrating some characteristic of the light setting that is saved for the corresponding light function form. For example, the icon background 66*a*, 66*b* can a degree of dimming and/or illumination that has been saved for the luminaire. For example, the icon background 20 may depict a degree of shading from black to increasingly lighter shades of gray to white to indicate increasing illumination from being off to the highest degree of illumination that can be provided by a lamp. In other embodiments, the icon background 20 may have cross-hatching to indicate a degree of dimming and/or illumination. For example, the icon background 20 may depict a degree of cross hatching density from no cross-hatching to increasingly denser crosshatching to a solid color to indicate increasing illumination from being off to the highest degree of illumination that can be provided by a lamp. In some embodiments, the icons 65*a*, 65*b* may be accompanied by a text notation the provides information of the light setting that is saved for the icon 65*a*, 65*b*. In the example depicted in FIG. 5, the icon having reference number 65*b* has a text notation for a color temperature of 5K.

Still referring to FIG. 5, the icons 65*a*, 65*b* can be arranged by scene 60*a*, 60*b*, 60*c*, in which the title 61 for the scene can indicate a room type, e.g., living room, kitchen or office; a. floor within a building; and/or a building within an office park. A user selecting an icon 65*a*, 65*b* within a scene 60*a*, 60*b*, 60*c* can activate, i.e., energize the lamp to produce light, the lamp to project light within the scene having characteristics consistent with the saved light setting. The user can select an icon 65*a* for each light function form within a scene individually, to individually turn on lights to project light (or turn light off) having the saved light setting. The user can also select an icon 65*b* for all the light form functions that are within a scene, so that all the light form functions can be set to have the same lighting characteristics, and be turned "on" or "off" at the same time. Each of the icons may further include an identifier illustrating when a lamp is turned "on" or "off". Referring to FIG. 2, a user may access the previously saved light settings in the screen shot depicted in FIG. 5 by selecting the previously saved settings icon 42, e.g., by touch screen gesture.

Referring to FIG. 1, at step 6 of the method, the user may decide whether another light setting is to be configured. If further lighting adjustments are to be performed the method may repeat starting from step 2. If the user does not desire to perform further lighting adjustments, the user may end the light control interface session at step 7.

Figure 6:
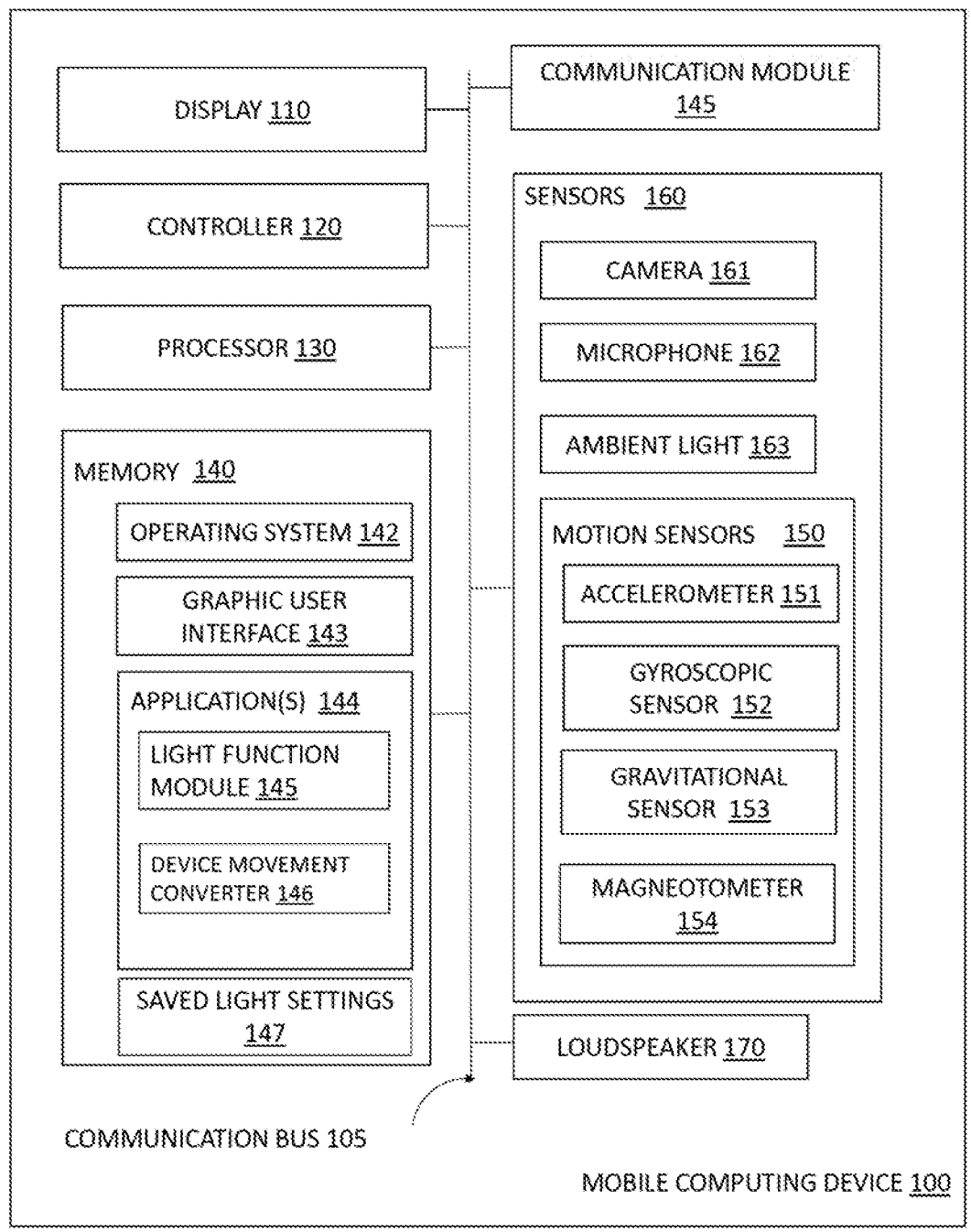
FIG. 6 is an illustration (block diagram) an exemplary mobile device system for controlling lighting using a mobile computing device having a motion sensor that is present therein, in accordance with an embodiment of the present disclosure.

FIG. 6 depicts one embodiment of a mobile computing device 100 having a motion sensor 150 that is present therein for controlling lighting, as described with reference to FIGS. 1-5, The mobile computing device 100 for controlling lighting may include a motion sensor 150 for detecting movements of the mobile computing device 100; and a graphic user interface 25, 143 having a cursor 20*a*, 20*b*, 20*c* that is traversed across the graphic user interface 25, 143 in response to the movements of the mobile computing device 100 detected by the motion sensor 150. The mobile computing device 100 may also include a processor 130 coupled to memory 140, the processor 130 configured to display using a light function module 145 a plurality of selectable light function settings 15*a*, 15*b*, 15*c* on the graphic user interface 25, 143, and correlate using a device motion to cursor motion conversion module (also referred to as device movement converter 146) the movements of the mobile computing device 100 to positioning of the cursor 20*a*, 20*b*, 20*c* on a selected light function setting 15*a*', 15*b*', 15*c*' of the plurality of selectable light function settings 15*a*, 15*b*, 15*c*. Referring to FIG. 6, the mobile computing device 100 includes a communications module 145 configured to transmit a signal to a luminaire providing instruction that the luminaire display/project light having the characteristics of the selected light function setting 15*a*', 15*b*', 15*c*'.

The mobile computing device 100 can be any of a wide range of computing platforms. In some embodiments, the mobile computing device 100 can be a laptop/notebook computer or sub-notebook computer; a tablet or phablet computer; a mobile phone or smartphone; a personal digital assistant (PDA); a portable media player (PMP); a cellular handset; a handheld gaming device; a gaming platform; a wearable or otherwise body-borne computing device, such as a smartwatch, smart glasses, or smart headgear; and/or a combination of any one or more thereof.

The mobile computing device 100 may include a display 110. The display 110 can be any electronic visual display or other device configured to display or otherwise generate an image (e.g., image, video, text, and/or other displayable content) therefrom. In some embodiments, the display 110 is a touchscreen display or other touch-sensitive display that can utilize any of a wide range of touch-sensing techniques, such as, for example: resistive touch-sensing; capacitive touch-sensing; surface acoustic wave (SAW) touch-sensing; infrared (IR) touch-sensing; optical imaging touch-sensing; and/or a combination of any one or more thereof. The touch screen display 110 may be configured to detect or otherwise sense direct and/or proximate contact from a user's finger, stylus, or other suitable implement (which can be collectively referred to as a touch gesture) at a given location of that display 110. The touch screen display 110 may be configured to translate such contact into an electronic signal that can be processed by mobile computing device 100 (e.g., by the one or more processors 130 thereof) and manipulated or otherwise used to trigger a given GUI action. In some cases, a touch-sensitive display 110 may facilitate user interaction with computing device 100 via the graphic user interface 25, 143 presented by such display 110. Further details regarding the graphic user interface 25, 143 that is depicted on the display 110 have been provided in the above description of FIGS. 2, 3 and 5, in which the graphic user interface 25 includes at least one of a color wheel 10a, dimming scale 10b and color temperature scale 10c having a plurality of selectable light function settings 15a, 15b, 15c, and icons 65a, 65b corresponding to saved light functions. Further details regarding the graphic user interface are provided in the above description of step 1 of the method depicted in FIG. 1.

In accordance with some embodiments, the computing device 100 may include or otherwise be communicatively coupled with one or more controllers 120, as depicted in FIG. 6. A given controller 120 may be configured to output one or more control signals to control any one or more of the various components/modules of computing device 100 and may do so, for example, based on wired and/or wireless input received from a given local source (e.g., such as on-board memory 140) and/or remote source (e.g., such as a control interface, optional server/network 400, etc.). In accordance with some embodiments, a given controller 120 may host one or more control modules and can be programmed or otherwise configured to output one or more control signals, for example, to adjust the operation of a given portion of computing device 100. For example, in some cases, a given controller 120 may be configured to output a control signal to control operation of one or more sensors 160, e.g., the motion sensors 150, such as the gyroscopic sensor 152 and/or accelerometer 151. For example, in response to the selection of a color icon 40a, dimming icon 40b, and/or color temperature icon 40c of the graphic user interface 25 depicted in FIG. 2, as described for step 2 of FIG. 1, the controller 120 may activate the appropriate motion sensor e.g., gyroscopic sensor 152 or accelerometer 151, to measure the orientation of the mobile computing device 100 for an baseline orientation from which the motions of the mobile computing device 100 can be measured and correlated to motions of the cursor 20a, 20b, 20c on the graphic user interface 20 for selecting selectable light function settings 15a, 15b, 15c.

The computing device 100 may include memory 140 and one or more processors 130. Memory 140 can be of any suitable type (e.g., RAM and/or ROM, or other suitable memory) and size, and in some cases may be implemented with volatile memory, non-volatile memory, or a combination thereof. A given processor 130 of computing device 100 may be configured as typically done, and in some embodiments may be configured, for example, to perform operations associated with computing device 100 and one or more of the modules thereof (e.g., within memory 140 or elsewhere). In some cases, memory 140 may be configured to be utilized, for example, for processor workspace (e.g., for one or more processors 130) and/or to store media, programs, applications, and/or content on computing device 100 on a temporary or permanent basis.

The one or more modules stored in memory 140 can be accessed and executed, for example, by the one or more processors 130 of computing device 100. In accordance with some embodiments, a given module of memory 140 can be implemented in any suitable standard and/or custom/proprietary programming language, such as, for example C, C++, objective C, JavaScript, and/or any other suitable custom or proprietary instruction sets, as will be apparent in light of this disclosure. The modules of memory 140 can be encoded, for example, on a machine-readable medium that, when executed by one or more processors 130, carries out the functionality of computing device 100, in part or in whole. The computer-readable medium may be, for example, a hard drive, a compact disk, a memory stick, a server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic. Some embodiments can be implemented with a microcontroller having input/output capability (e.g., inputs for receiving user inputs; outputs for directing other components) and a number of embedded routines for carrying out the device functionality. In a more general sense, the functional modules of memory 140 (e.g., such as operating system (OS) 142, graphic user interface (GUI) 143, and/or one or more applications 144, each discussed below) can be implemented in hardware, software, and/or firmware, as desired for a given target application or end-use. The memory 140 may include an operating system (OS) 142. The OS 142 can be implemented with any suitable OS, mobile or otherwise, such as, for example, Android OS from Google, Inc.; iOS from Apple, Inc.; BlackBerry OS from BlackBerry Ltd.; Windows Phone OS from Microsoft Corp; Palm OS/Garnet OS from Palm, Inc.; an open source OS, such as Symbian OS; and/or a combination of any one or more thereof. As will be appreciated in light of this disclosure, OS 142 may be configured, for example, to aid with the lighting controls that employ the motions of a mobile computing device 100 to select light characteristics to be projected by luminaires. For example, the OS 142 can be configured to aid in the movement of a cursor 20a, 20b, 20c on a graphic user interface 25 including a plurality of selectable light characteristics 10a, 10b, 10c, 15a, 15b, 15c, in which the movement of the cursor is correlated to movement of the mobile computing device 100 measured by a motion sensor 150 present therein.

The memory 140 may also include at least one module for saved light settings 147. The saved light settings 147 include the lighting parameters that a user may have saved for a light function form, e.g., lamp type, or scene, e.g., room type. Further details on the saved light settings 147 are provided in the description of the screen shot 55 of the previously saved light settings that is depicted in FIG. 5.

In accordance with some embodiments, mobile computing device 100 may include a graphic user interface (GUI) module 143. In some cases, GUI 143 can be implemented in memory 140. GUI 143 may be configured, in accordance with some embodiments, to present a graphical UI (GUI) at display 110 that is configured, for example, to aid with the lighting control techniques that employ motions applied to the mobile computing device 100 to control a cursor 20a, 20b, 20c on a graphic user interface 25 for selecting at least one of a plurality of selectable light settings 15a, 15b, 15c, as described herein.

The memory 140 may have stored therein (or otherwise have access to) one or more applications 144. In some instances, mobile computing device 100 may be configured to receive input, for example, via one or more applications 144 stored in memory 140, such as a light function module 145 and a device movement converter 146. The light function module 145 provides a plurality of selectable light function settings 15a, 15b, 15c on the graphic user interface 25. For example, the light function module 145 may provide a color wheel 10a for selecting colors for selectable light function settings 15a with a cursor 20a that is controlled through motions applied to the mobile computing device 100. Further details for the color wheel 10a are provided in the description of step 1 of FIG. 1, and the color wheel 10a depicted in FIGS. 2 and 3. For example, the light function module 145 may provide a dimming scale 10b for selecting light intensity for selectable light function settings 15b with a cursor 20b that is controlled through motions applied to the mobile computing device 100. Further details for the dimming scale 10b are provided in the description of step 1 of FIG. 1, and the dimming scale 10a depicted in FIG. 2. For example, the light function module 145 may provide a color temperature scale 10c for selecting color temperature for selectable light function settings 15c with a cursor 20c that is controlled through motions applied to the mobile computing device 100. Further details for the color temperature scale 10c are provided in the description of step 1 of FIG. 1, and the color temperature scale 10c depicted in FIG. 2.

The device movement converter 146 can correlate device motion, i.e., motions applied to the mobile computing device 100, to cursor 20a, 20b, 20c on the graphic user interface 25 for positioning of the cursor 20a, 20b, 20c on a selected light function setting 15a', 15b', 15c' of the plurality of selectable light function settings 15a, 15b, 15c. The motions applied to the mobile computing device 100, e.g., linear motions and/or rotational motion, are measured by the motions sensors 150, e.g., accelerometer 151 and/or gyroscopic sensor 152. The device movement converter 146 may communicate with the controller 120, the motion sensors 150 and the graphic user interface module 143 to provide motion for the cursor 20a, 20b, 20c on the graphic user interface 25 that is responsive to motions applied to the mobile computing device 100. Further details on the type of motions that can be applied to the mobile computing device 100 are explained with reference to FIG. 4. The mobile sensor 150 measures the motions, which can then be transmitted to the device movement converter 146. The device movement converter 146 converts the transmitted signals from the motion sensors 150 to movement of the cursor 20a, 20b, 20c on the graphic user interface 25. Further details regarding how movements applied to the mobile computing device 100 control the motion of the cursor 20a, 20b, 20c on the graphic user interface 25 to select selectable light function settings 15a, 15b, 15c are provided in the description of step 2 of the method described in FIG. 1, as well as the screen shot of the graphic user interface 25 depicted in FIG. 2, and the depiction of the motions applied to the mobile computing device 100 that are depicted in FIG. 4.

The device movement converter 146 can also correlate movement applied to the mobile computing device 100 to commands. For example, liner motions applied, such as an upward or downward motion along axis Z-Z of the mobile computing device 100 that is depicted in FIG. 4 can provide a confirmation gesture for setting the light projected by the luminaire that is consistent with the cursor 20a, 20b, 20c being present on the light function 15a, 15b, 15c that is selected, as described in step 5 of the method depicted in FIG. 1. The mobile sensor 150 measures the motions applied to the mobile computing device 100 as confirmation gestures, which can then be transmitted to the device movement converter 146. The device movement converter 146 converts the transmitted signals from the motion sensors 150 to commands for setting the selected light to the luminaire. Further details are provided in the description of step 5 of FIG. 1.

In some embodiments, mobile computing device 100 may include a communication module 145. The communication module 145 can be configured to transmit a signal to a luminaire providing instruction that the luminaire display the selected light function setting 15a', 15b', 15c' that is selected by the cursor 20a, 20b, 20c. The communication module 145 may be configured for wired (e.g., Universal Serial Bus or USB, Ethernet, FireWire, etc.) and/or wireless (e.g., Bluetooth, etc.) communication using any suitable wired and/or wireless transmission technologies (e.g., radio frequency, or RF, transmission; infrared, or IR, light modulation; etc.), as desired. In some embodiments, the communication module 145 may be configured for communication by cellular signal used in cellular phones, and cellular type devices. In some embodiments, communication module 145 may be configured to communicate locally and/or remotely utilizing any of a wide range of wired and/or wireless communications protocols, including, for example: (1) a digital multiplexer (DMX) interface protocol; (2) a protocol; (3) a Bluetooth protocol; (4) a digital addressable lighting interface (DALI) protocol; (5) a ZigBee protocol; (6) a near field communication (NFC) protocol; (7) a local area network (LAN)-based communication protocol; (8) a cellular-based communication protocol; (9) an Internet-based communication protocol; (10) a satellite-based communication protocol; and/or (11) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 145, as desired for a given target application or end-use. In some instances, communication module 145 may be configured to communicate with one or more luminaires 200. In some cases, communication module 145 of computing device 100 and communication module 250 of a given luminaire 200 (as further described in FIG. 7) may be configured to utilize the same communication protocol. In some cases, communication module 145 may be configured to communicate with a server/network 400 (as further described in FIG. 8). Further details regarding the function of the communication module 145 are provided in the description of step 4 of the method described in FIG. 1.

In accordance with some embodiments, mobile computing device 100 may include one or more sensors 160. The motion sensors 150 of the sensors 160 housed within the mobile computing device 100, such as at least one accelerometer 151, gravitational sensor 153, gyroscopic sensor 152, and/or magnetometer 154, may be used to detect movement of mobile computing device 100 to control a cursor 20a, 20b, 20c on a graphic user interface 25 for selecting and adjusting lighting parameters, e.g., by selecting selectable light function settings 15a, 15b, 15c provided on a graphic user interface 25 of the mobile computing device 100. Further details regarding how movements applied to the mobile computing device 100 control the motion of the cursor 20a, 20b, 20c on the graphic user interface 25 to select selectable light function settings 15a, 15b, 15c are provided in the description of step 2 of the method described in FIG. 1, as well as the screen shot of the graphic user interface depicted in FIG. 2, and the depiction of the motions applied to the mobile computing device that are depicted in FIG. 4.

In some embodiments, in addition to the motion sensors 150 controlling the cursor 20a, 20b, 20c on the graphic user interface 25 for selecting light function settings 15, 15b, 15c, the motion sensors 150 may be employed for measuring gestures applied to the mobile computing device for signaling confirmation of a selected light function, e.g., the setting of the light projected by the luminaire consistent with the cursor being present on the light function that is selected at step 5 of the method illustrated in FIG. 1.

In some embodiments, a given mobile computing device 100 may include other sensors 160 in addition the aforementioned motion sensors, which can include at least one camera 161 (or image capture device), microphone 163 (or sound capture device), ambient light sensor 165, and/or any other suitable sensor to, for example, implement the techniques variously described herein. In some embodiments, the camera 161 may be employed in eye contact commands, such as with iris scanners, in which the eye contact command can provide a confirmation gesture for setting the light projected by the luminaire that is consistent with the cursor 20a, 20b, 20c being present on the light function 15a, 15b, 15c that is selected, as described in step 5 of the method depicted in FIG. 1. In some embodiments, the microphone 163 may be employed in voice commands, in which the voice command can provide a confirmation command for setting the light projected by the luminaire that is consistent with the cursor 20a, 20b, 20c being present on the light function 15a, 15b, 15c that is selected, as described in step 5 of the method depicted in FIG. 1.

The sensor(s) 160 of a given mobile computing device 100 may include componentry as desired for a given target application or end-use. Also, it should be noted that the present disclosure is not so limited only to the example sensors 160 shown, as additional and/or different sensors 160 may be provided, as desired for a given target application or end-use, in accordance with some other embodiments.

In accordance with some embodiments, mobile computing device 100 may include one or more loudspeakers 170 or other audio output devices, in accordance with some embodiments. Loudspeaker(s) 170 can be, for example, a speaker or any other device capable of producing sound from an audio data signal, in accordance with some embodiments. In some embodiments, the loudspeaker(s) can emit a tone as an affirmation single that the mobile computing device 100 has received a signal to set the light being projected from the luminaire consistent with the cursor 20a, 20b, 20c being present on the light function 15a, 15b, 15c that is selected, as described in step 5 of the method depicted in FIG. 1. In some instances, audio output device 170 may be integrated, in part or in whole, with mobile computing device 100, whereas in some other instances, audio output device 170 may be a stand-alone component configured to communicate with mobile computing device 100 using any suitable wired and/or wireless communications means, as desired.

As illustrated in FIG. 6, the aforementioned elements of the mobile computing device 100 may be interconnected with a communications bus 105.

Figure 7:
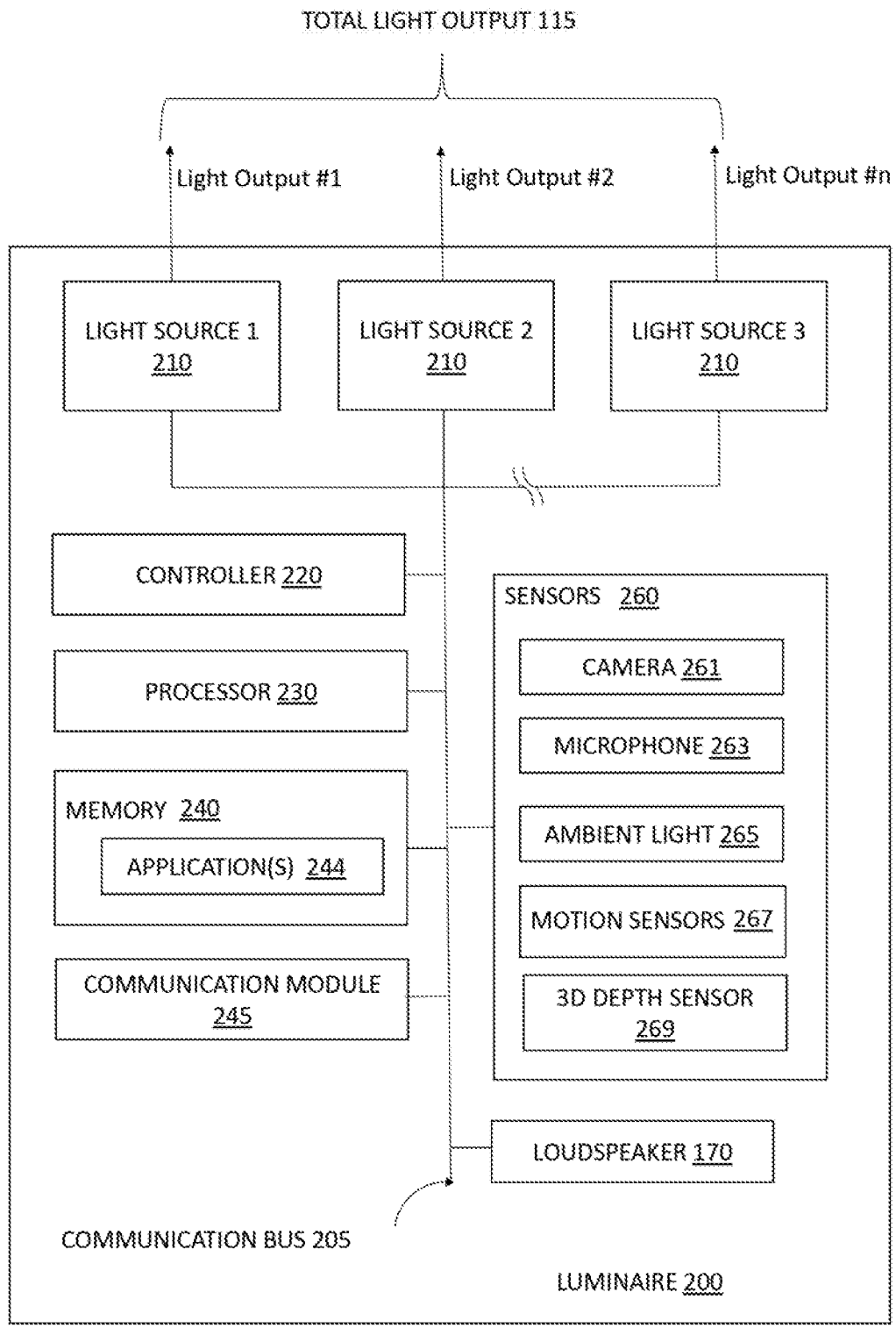
FIG. 7 is an illustration (block diagram) of an exemplary luminaire system that can work in communication with the mobile device system for controlling lighting, in accordance with one embodiment of the present disclosure.
Figure 8:
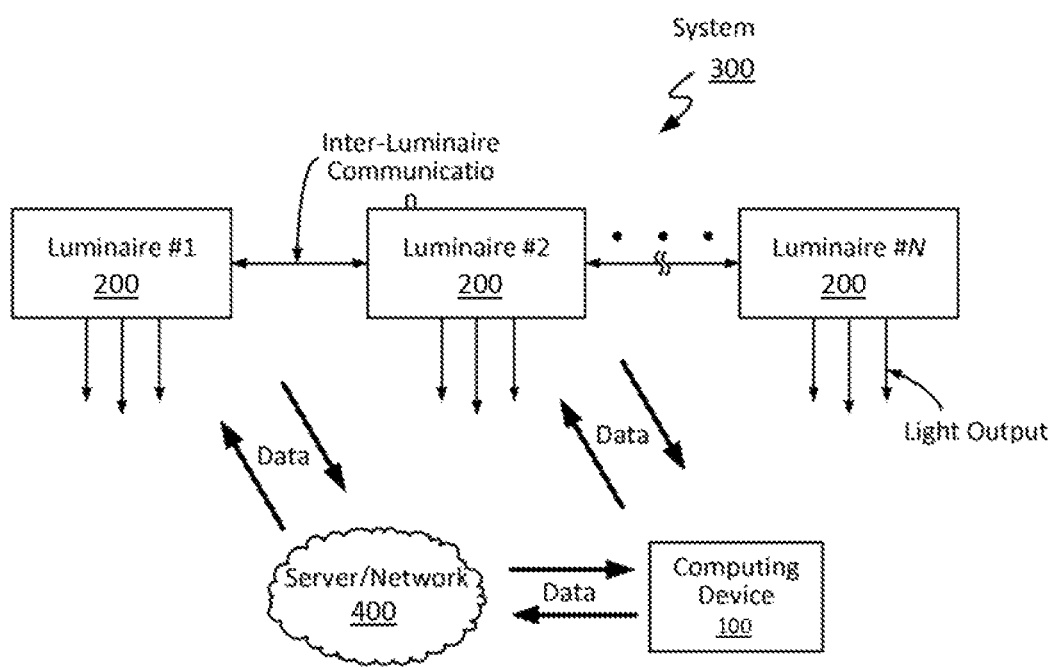
FIG. 8 is an illustration depicting one example of a lighting system that can employ the mobile device system and the luminaire systems to control lighting, in accordance with one embodiment of the present disclosure.

FIG. 7 is a block diagram depicting an exemplary luminaire 200 that can work in communication with the mobile computing device 100 for controlling lighting. As can be seen, luminaire 200 may include one or more light sources 210 that each provide corresponding light output. The number n of light sources 210 for a given luminaire 200 can be customized as desired for a given target application or end-use. The light sources 210 and componentry of luminaire 200 will be described in more detail herein. However, note that luminaire 200 may include additional or alternative componentry based on the specific configuration used. For example, in the case of luminaire 200 including solid-state light sources 210, luminaire 200 may include componentry, such as at least one driver, modulator, digital to analog (DAC) converter (not shown), just to name some additional example componentry. Also note that although the componentry (e.g., controller 220, processor 230, etc.) is shown as being within the box representing luminaire 200, such componentry need not be physically located within the housing of luminaire 200. In some embodiments, some or all (or alternative) componentry shown in FIG. 7 may generally be a part of lighting system 300 as shown in FIG. 8 and may be used to control multiple luminaires 200 (e.g., control multiple luminaires 200 simultaneously). In some embodiments, luminaire 200 may include one or more solid-state light sources 210. A given solid-state light source may include one or more solid-state emitters, which may be any of a wide range of semiconductor light source devices, such as, for example: a light-emitting diode (LED); (2) an organic light-emitting diode (OLED); (3) a polymer light-emitting diode (PLED); and/or (4) a combination of any one or more thereof. In some embodiments, a given solid-state emitter may be configured for color-tunable emissions. For instance, in some cases, a given solid-state emitter may be a multi-color (e.g., hi-color, tri-color, etc.) semiconductor light source configured for a combination of emissions, such as: (1) red-green-blue (RCB); (2) red-green-blue-yellow (RGBY); (3) red-green-blue-white (RGBW); (4) dual-white; and/or (5) a combination of any one or more thereof. In some embodiments, luminaire 200 may include other light sources 210 in addition to or in the alternative of solid-state light sources 210, such as incandescent or fluorescent lighting, for example. The quantity and arrangement of lighting sources 210 utilized for each luminaire may be customized as desired for a given target application or end-use.

The luminaire 200 may include at least one controller 220, at least one processor 230, and/or memory 240. Controller(s) 220 may be configured to be operatively coupled (e.g., via a communication bus or other suitable interconnect) with light sources 210 or corresponding componentry, such as the light source drivers (not shown), to control the light output provided therefrom. Note that the light output from each light source 210 creates a total light output 215, in this example embodiment. In some embodiments, luminaire 200 may include a centralized controller 220 and/or processor 230 configured to control the total light output 215 of the entire system. In some such embodiments, the control of the light output may be wired and/or wireless, depending upon the given configuration. In some embodiments, light sources 210 of luminaire may be individually controlled. The controller 220 is in communication with the communication bus 205, hence receives signals from the mobile computing device 100 through the communications module 250. The signals received from the mobile computing device 100 can include information on selected light functions 15a', 15b', 15c', which can include light color, light intensity/dimming and light color temperature, that was selected by the user for the type of light to be projected by the luminaire 200. The controller 220 can control the light output to meet the requirements of the selected light function 15a', 15b', 15c' provided by the mobile computing device 100.

The memory 240 used by the luminaire 200 can be of any suitable type (e.g., RAM and/or ROM, or other suitable memory) and size, and in some cases may be implemented with volatile memory, non-volatile memory, or a combination thereof. A given processor 230 may be configured as typically done, and in some embodiments may be configured, for example, to perform operations associated with luminaire 200 or a given light source 210 and one or more of the modules thereof (e.g., within memory 240 or elsewhere). In some cases, memory 240 may be configured to be utilized, for example, for processor workspace (e.g., for one or more processors 230) and/or to store media, programs, applications 244, and/or content for luminaire 200 or system on a temporary or permanent basis.

The one or more modules stored in memory 240 can be accessed and executed, for example, by the one or more processors 230 of luminaire 200. In accordance with some embodiments, a given module of memory 240 can be implemented in any suitable standard and/or custom/proprietary programming language, such as, for example: (1) C; (2) C++; (3) objective C; (4) JavaScript; and/or (5) any other suitable custom or proprietary instruction sets, as will be apparent in light of this disclosure. The modules of memory 240 can be encoded, for example, on a machine-readable medium that, when executed by a processor 230, carries out the functionality of luminaire 200 or system, in part or in whole. The computer-readable medium may be, for example, a hard drive, a compact disk, a memory stick, a server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic. Some embodiments can be implemented with a microcontroller having input/output capability (e.g., inputs for receiving user inputs; outputs for directing other components) and a number of embedded routines for carrying out the device functionality. In a more general sense, the functional modules of memory 240 (e.g., one or more applications 242, discussed below) can be implemented in hardware, software, and/or firmware, as desired for a given target application or end-use.

In accordance with some embodiments, the memory 240 of the luminaire 200 may have stored therein (or otherwise have access to) one or more applications 242. In some instances, a given luminaire 200 may be configured to receive input, for example, via one or more applications 242 stored in memory 240. For instance, an example application 242 may allow a user to program or configure a luminaire 200 to project light having characteristics, such as the light color, light intensity/dimming, or light temperature color, that substantially match a selected light function setting 15a, 15b, 15c from a graphic user interface 25, in which the light function is selected through use of a cursor 20a, 20b, 20c that is controlled by motions applied to the mobile computing device 100 on which the graphic user interface is displayed.

In some embodiments, a given luminaire 200 may include a communication module 250, which may be configured for wired (e.g., Universal Serial Bus or USB, Ethernet, Fire-Wire, etc.) and/or wireless (e.g., Wi-Fi, Bluetooth, etc.) communication, as desired. In accordance with some embodiments, communication module 250 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; and/or (6) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 250, as desired for a given target application or end-use. In some instances, communication module 250 may be configured to facilitate inter-system communication between luminaires 200 and/or communication between luminaire(s) 200 and the mobile computing device 100.

In accordance with some embodiments, a given luminaire 200 may include one or more optional sensors 260. In some embodiments, a given luminaire 200 may optionally include at least one camera 261 (or image capture device), microphone 263 (or sound capture device), ambient light sensor 265, motion sensor 267, 3-dimensional (3D) depth sensor 269, and/or any other suitable sensor to, for example, implement the techniques variously described herein. When included, sensor(s) 260 may be configured as typically done. In another example, microphone 263 may be configured to detect voice commands used to control luminaire 200. In any case, the sensor(s) 260 of a given luminaire 200 may include componentry as desired for a given target application or end-use. Also, it should be noted that the present disclosure is not so limited only to the example optional sensors 260 shown, as additional and/or different sensors 260 may be provided, as desired for a given target application or end-use, in accordance with some other embodiments.

In accordance with some embodiments, a given luminaire 200 may include one or more loudspeakers 270 or other audio output devices. Loudspeaker(s) 270 can be, for example, a speaker or any other device capable of producing sound from an audio data signal, in accordance with some embodiments. Loudspeaker(s) 270 may be programmed using any suitable techniques and they may be configured to output audio related to the lighting control techniques variously described herein. For example, controller 220 and/or processor 230 may be configured to control audio output of the loudspeaker(s) 270 to provide audio feedback as to whether an attempted command has been recognized or provide audio feedback relating to the specific command detected or the resulting change in light output (e.g., dimming lights by 10%, changing light color to red, etc.). Numerous configurations and variations on luminaire(s) 200 will be apparent in light of this disclosure.

FIG. 8 illustrates an example lighting system 300, in accordance with an embodiment of the present disclosure. As can be seen, lighting system 300 includes multiple luminaires 200 and a mobile computing device 100. Luminaires 200 and the mobile computing device 100 may be configured to be communicatively coupled using, for example, server/network 400. Although lighting system 300 is shown in FIG. 8 as having any number N of luminaires 200, system 300 may include only luminaire 200 or multiple luminaires 200 each of which are configured to output light. Luminaires 200 are shown having inter-luminaire communication capabilities in example lighting system 300, which may be provided via any suitable wired and/or wireless techniques to, for example, allow a luminaire 200 to transmit and/or receive data from one or more other luminaires 200, such as data related to the lighting control methods, systems and computer program products as variously described herein with reference to FIGS. 1-8. In some embodiments, luminaires 200 may be communicatively coupled using, for example, server/network 400. However, luminaires 200 need not have such inter-luminaire communication capabilities.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a method, system and computer program product for controlling lighting, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method of controlling lighting comprising:
    displaying on a graphic user interface displayed on a screen of a mobile device a grid of light functions, the grid of light functions comprising a plurality of selectable light function settings;
    selecting a light function setting from the selectable light function settings on the grid of light functions that is displayed on the screen of the mobile device by traversing a cursor being displayed on the screen of the mobile device over the light function setting that is selected, the traversing of the cursor on the graphic user interface displayed on the screen being controlled by motion of said mobile device, wherein the mobile device includes motion sensors for correlating said motion of the mobile device to said traversing of said cursor and setting light function settings, the motion sensors including a gyroscope for measuring rotational movement of the mobile computing device and an accelerometer for measuring linear movement of the mobile computing device, wherein rotating the mobile computing device about a first axis extending a length of the mobile device in a first direction traverses the cursor left on the graphic user interface, and rotating the mobile computing device about the first axis extending the length of the mobile device in a second direction traverses the cursor right on the graphic user interface, and wherein rotating the mobile computing device about a second axis extending a width of the mobile device in a third direction traverses the cursor up on the graphic user interface, and rotating the mobile computing device about the second axis extending the width of the mobile device in fourth direction traverses the cursor down on the graphic user interface;
    transmitting a control signal for the light function setting that is selected from said mobile device to a luminaire, wherein the luminaire projects light with properties consistent with said light function setting simultaneously with the cursor being present on said light function that is selected as the cursor is being traversed between the plurality of selectable light function settings; and
    setting the luminaire to project the light with the light function setting that is selected by the cursor with a linear motion applied to the mobile device measured by the accelerometer, and sending a selected light setting signal to the luminaire.

2. The method of claim 1, wherein said plurality of selectable light function settings includes a plurality of colors.

3. The method of claim 1, wherein the grid of light functions comprises a first field of a color wheel, a second field of a dimming scale, a third field of a color temperature scale or a combination thereof, in which the plurality of selectable light function settings comprises a first selectable light function setting for color from the color wheel in the first field, a second selectable light function setting for dimming from the dimming scale in the second field, a third selectable light function setting for color temperature from the color temperature scale in the third field or a combination thereof.

4. The method of claim 3, wherein the graphic user interface is displayed on said screen that is a touch screen pointing device, the graphic user interface comprises a color icon, a dimming icon, or a color temperature icon, wherein selection of the color icon by a first touch gesture with the touch screen activates the first field including the color wheel, selection of the dimming icon by a second touch gesture with the touch screen activates the second field including the dimming scale, and selection of the dimming icon by a third touch gesture with the touch screen activates the third field including the color temperature scale.

5. The method of claim 4, wherein during said selection of the color icon, the cursor is present in the first field including the color wheel and is activated, wherein tilting the mobile device about a pitch axis moves the cursor along a first direction extending from an upper surface to a lower surface along the color wheel, and rotating the mobile device about a roll axis moves the cursor along a second direction extending from a left side of the color wheel to a right side of the color wheel.

6. The method of claim 4, wherein during said selection of the color icon, the cursor is present in the first field including the color wheel and is activated, wherein first traversing the mobile device in a vertical direction moves the cursor along a first direction extending from an upper surface to a lower surface along the color wheel, and second traversing the mobile device in a horizontal direction moves the cursor along a second direction extending from a left side of the color wheel to a right side of the color wheel.

7. The method of claim 4, wherein during said selection of the dimming icon, the cursor is present in the second field including the dimming scale and is activated, wherein rotating the mobile device about a roll axis moves the cursor along a second direction extending from a left side of the dimming scale to a right side of the dimming scale.

8. The method of claim 4, wherein during said selection of the dimming icon, the cursor is present in the second field including the dimming scale and is activated, wherein traversing the mobile device along a horizontal axis moves the cursor along a second direction extending from a left side of the dimming scale to a right side of the dimming scale.

9. The method of claim 4 further comprising setting the light projected by the luminaire consistent with the cursor being present on said light function that is selected by releasing touch selectivity of the color icon, the dimming icon, the color temperature icon or a combination thereof.

10. The method of claim 1 further comprising setting the light projected by the luminaire consistent with the cursor being present on said light function that is selected with a confirmation gesture applied through a motion of the mobile device.

11. A mobile device for controlling lighting comprising:
motion sensors for detecting movements of the mobile device, wherein the motion sensors includes a gyroscope for measuring rotational movement of the mobile computing device and an accelerometer for measuring linear movement of the mobile computing device;
a graphic user interface having a cursor displayed on a display screen of the mobile device;
a processor coupled to memory, the processor configured to display using a light function module a plurality of selectable light function settings on the graphic user interface, and correlate using a device motion to cursor motion conversion module the movements of the mobile device to positioning of the cursor on a selected light function setting of the plurality of selectable light function settings on the graphic user interface that is displayed on the display screen of the mobile device, wherein rotating the mobile computing device about a first axis extending a length of the mobile device in a first direction traverses the cursor left on the graphic user interface, and rotating the mobile computing device about the first axis extending the length of the mobile device in a second direction traverses the cursor right on the graphic user interface, and wherein rotating the mobile computing device about a second axis extending a width of the mobile device in a third direction traverses the cursor up on the graphic user interface, and rotating the mobile computing device about the second axis extending the width of the mobile device in fourth direction traverses the cursor down on the graphic user interface, wherein linear motion applied to the mobile device is measured by the accelerometer; and
a communications module configured to transmit a select signal to a luminaire providing instruction that the luminaire project light having characteristics of the selected light function setting simultaneously with the cursor being present on said light function that is selected as the cursor is being traversed between the plurality of selectable light function settings, and the communications module to transmit a set signal to set the luminaire to project the light with the light function setting that is selected by the cursor when a linear motion is applied to the mobile device as measured by the accelerometer.

12. The mobile device of claim 11, wherein said plurality of selectable light function settings includes a plurality of colors.

13. The mobile device of claim 11, wherein the plurality of selectable light function settings comprises a first field of a color wheel, a second field of a dimming scale, a third filed of a color temperature scale or a combination thereof.

14. The mobile device of claim 13, wherein the plurality of selectable light function settings comprises a first selectable light function setting for color from the color wheel in the first field, a second selectable light function setting for dimming from the dimming scale in the second field, a third selectable light function setting for color temperature from the color temperature scale in the third field or a combination thereof.

15. The mobile device of claim 14, wherein the display screen is a touch screen pointing device, the graphic interface includes a color icon, dimming icon and a temperature color icon, wherein selection of the color icon by a first touch gesture with the touch screen activates the first field including the color wheel, selection of the dimming icon by a second touch gesture with the touch screen activates the second field including the dimming scale or selection of the color temperature icon by a third touch gesture with the touch screen activates the third field including the color temperature scale.

16. A non-transitory computer readable storage medium including contents that are configured to cause a computer to perform a method for controlling lighting, the method comprising:
displaying on a graphic user interface displayed on a screen of a mobile device a grid of light functions, the grid of light functions comprising a plurality of selectable light function settings;
selecting a light function setting from the selectable light function settings on the grid of light functions that is displayed on the screen of the mobile device by traversing a cursor being displayed on the screen of the mobile device over the light function setting that is selected, the traversing of the cursor on the graphic user interface displayed on the screen being controlled by motion of said mobile device, wherein the mobile device includes motion sensors for correlating said motion of the mobile device to said traversing of said cursor and setting light function settings, the motion sensors including a gyroscope for measuring rotational movement of the mobile computing device and an accelerometer for measuring linear movement of the mobile computing device, wherein rotating the mobile computing device about a first axis extending a length of the mobile device in a first direction traverses the cursor left on the graphic user interface, and rotating the mobile computing device about the first axis extending the length of the mobile device in a second direction traverses the cursor right on the graphic user interface, and wherein rotating the mobile computing device about a second axis extending a width of the mobile device in a third direction traverses the cursor up on the graphic user interface, and rotating the mobile computing device about the second axis extending the width of the mobile device in fourth direction traverses the cursor down on the graphic user interface;
transmitting a control signal for the light function setting that is selected from said mobile device to a luminaire, wherein the luminaire projects light with properties consistent with said light function setting simultaneously with the cursor being present on said light function that is selected as the cursor is being traversed between the plurality of selectable light function settings; and setting the luminaire to project the light with the light function setting that is selected by the cursor with a linear motion applied to the mobile device measured by the accelerometer, and sending a selected light setting signal to the luminaire.

17. The non-transitory computer readable storage medium as recited in claim 16, wherein the grid of light functions comprises a first field of a color wheel, a second field of a dimming scale, a third field of a color temperature scale or a combination thereof.

18. The non-transitory computer readable storage medium as recited in claim 17, wherein the plurality of selectable light function settings comprises a first selectable light function setting for color from the color wheel in the first field, a second selectable light function setting for dimming from the dimming scale in the second field, a third selectable light function setting for color temperature from the color temperature scale in the third field or a combination thereof.

19. The non-transitory computer readable storage medium as recited in claim 18, wherein the graphic user interface is displayed on a touch screen pointing device, the graphic user interface comprises a color icon, a dimming icon, color temperature icon or combination thereof, wherein selection of the color icon by a first touch gesture with the touch screen activates the first field including the color wheel, selection of the dimming icon by a second touch gesture with the touch screen activates the second field including the dimming scale, and selection of the color temperature icon by a third touch gesture with the touch screen activates the third field including the color temperature scale.

20. The non-transitory computer readable storage medium as recited in claim 19, wherein during said selection of the color icon, the cursor is present in the first field including the color wheel and is activated, wherein tilting the mobile device about a pitch axis moves the cursor along a first direction extending from an upper surface to a lower surface along the color wheel, and rotating the mobile device about a roll axis moves the cursor along a second direction extending from a left side of the color wheel to a right side of the color wheel.

* * * * *